United States Patent
Joseph et al.

(10) Patent No.: US 12,250,614 B2
(45) Date of Patent: Mar. 11, 2025

(54) UPLINK BROADCAST/MULTICAST PACKET PROCESSING

(71) Applicant: QUALCOMM Incorporated, San Diego, CA (US)

(72) Inventors: Vinay Joseph, Calicut (IN); Rajat Prakash, San Diego, CA (US); Peerapol Tinnakornsrisuphap, San Diego, CA (US); Fatih Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/521,886

(22) Filed: Nov. 28, 2023

(65) Prior Publication Data

US 2024/0098459 A1 Mar. 21, 2024

Related U.S. Application Data

(62) Division of application No. 16/985,157, filed on Aug. 4, 2020, now Pat. No. 11,856,489.

(Continued)

(51) Int. Cl.
*H04W 4/06* (2009.01)
*H04W 24/08* (2009.01)
(Continued)

(52) U.S. Cl.
CPC ............. *H04W 4/06* (2013.01); *H04W 24/08* (2013.01); *H04W 28/06* (2013.01); *H04W 80/02* (2013.01)

(58) Field of Classification Search
CPC ... H04W 40/24; H04W 36/0033; H04W 4/24; H04W 8/08; H04W 80/10; H04W 28/06; H04W 76/15; H04W 92/20
See application file for complete search history.

(56) References Cited

U.S. PATENT DOCUMENTS 10,812,629 B2 * 10/2020 Park .................. H04W 8/08
10,855,814 B2 * 12/2020 Park .................. H04W 8/08
(Continued)

FOREIGN PATENT DOCUMENTS

CN 102647793 A 8/2012
CN 114208224 A * 3/2022 ......... H04L 12/1886
(Continued)

OTHER PUBLICATIONS

V. K. Shrivastava, S. Baek and Y. Baek, "5G Evolution for Multicast and Broadcast Services in 3GPP Release 17," in IEEE Communications Standards Magazine, vol. 6, No. 3, pp. 70-76, Sep. 2022, doi: 10.1109/MCOMSTD.0001.2100068 (Year: 2022).*

(Continued)

*Primary Examiner* — William D Cumming
(74) *Attorney, Agent, or Firm* — Kevin M. Donnelly; Procopio, Cory, Hargreaves & Savitch LLP

(57) ABSTRACT

Methods, devices, and systems for processing uplink broadcast or multicast ("broadcast/multicast") packets from a user equipment (UE) and distributing the broadcast/multicast packets to other UEs in a network. In some aspects, a UE may receive, from a base station, a downlink packet comprising broadcast or multicast (broadcast/multicast) Ethernet data for a protocol data unit (PDU) session of the UE with a data network (DN) associated with the base station, determining whether the downlink packet corresponds to an uplink packet previously transmitted to the base station by the UE, discarding the downlink packet for the PDU session based on determining that the UE previously transmitted the corresponding uplink packet comprising the broadcast/multicast Ethernet data for the PDU session to the base station, and processing the downlink packet for the PDU session based on determining that the UE did not previously transmit the corresponding uplink packet.

30 Claims, 16 Drawing Sheets

Related U.S. Application Data

(60) Provisional application No. 62/884,625, filed on Aug. 8, 2019.

(51) Int. Cl.
*H04W 28/06* (2009.01)
*H04W 80/02* (2009.01)

(56) References Cited

U.S. PATENT DOCUMENTS

| | | | |
|---|---|---|---|
| 11,438,822 B2 * | 9/2022 | Salahuddeen | H04W 72/21 |
| 11,445,335 B2 * | 9/2022 | Li | H04W 4/08 |
| 11,496,943 B2 * | 11/2022 | Raghothaman | H04L 5/0048 |
| 11,516,722 B2 * | 11/2022 | Raghothaman | H04L 5/0048 |
| 11,582,330 B2 * | 2/2023 | Park | H04L 69/321 |
| 11,838,748 B2 * | 12/2023 | Raghothaman | H04L 5/0044 |
| 11,838,749 B2 * | 12/2023 | Salahuddeen | H04L 5/0044 |
| 11,849,009 B2 * | 12/2023 | Park | H04W 36/0088 |
| 11,856,489 B2 * | 12/2023 | Joseph | H04L 5/0053 |
| 2008/0080381 A1 | 4/2008 | Maheshwari et al. | |
| 2010/0195555 A1 | 8/2010 | Cheng et al. | |
| 2019/0124181 A1 * | 4/2019 | Park | H04W 36/0033 |
| 2019/0124572 A1 * | 4/2019 | Park | H04W 40/24 |
| 2020/0059761 A1 * | 2/2020 | Li | H04W 4/24 |
| 2020/0412842 A1 * | 12/2020 | Park | H04W 80/10 |
| 2021/0006371 A1 * | 1/2021 | Raghothaman | H04W 72/04 |
| 2021/0006944 A1 * | 1/2021 | Raghothaman | H04L 69/164 |
| 2021/0007039 A1 * | 1/2021 | Salahuddeen | H04W 72/30 |
| 2021/0044936 A1 * | 2/2021 | Joseph | H04W 28/06 |
| 2021/0084121 A1 * | 3/2021 | Park | H04W 76/15 |
| 2021/0306912 A1 | 9/2021 | Stojanovski et al. | |
| 2021/0345108 A1 | 11/2021 | Li et al. | |
| 2021/0409999 A1 | 12/2021 | Chilla et al. | |
| 2022/0086699 A1 | 3/2022 | Claeson et al. | |
| 2022/0174577 A1 * | 6/2022 | Raghothaman | H04W 72/04 |
| 2022/0174761 A1 | 6/2022 | Guo et al. | |
| 2022/0224646 A1 | 7/2022 | Xiong | |
| 2022/0256432 A1 * | 8/2022 | Salahuddeen | H04W 40/02 |
| 2022/0329530 A1 | 10/2022 | Yang et al. | |
| 2022/0338050 A1 | 10/2022 | Liu et al. | |
| 2023/0131685 A1 * | 4/2023 | Raghothaman | H04L 5/0044 370/329 |
| 2023/0224380 A1 * | 7/2023 | Park | H04W 36/0005 370/331 |
| 2024/0098459 A1 * | 3/2024 | Joseph | H04W 80/02 |
| 2024/0146827 A1 * | 5/2024 | Park | H04W 36/0005 |

FOREIGN PATENT DOCUMENTS

| | | | |
|---|---|---|---|
| EP | 3866508 A1 | 8/2021 | |
| EP | 4011034 A1 * | 6/2022 | H04L 12/1886 |
| WO | 2019223005 A1 | 11/2019 | |
| WO | WO-2021026252 A1 * | 2/2021 | H04L 12/1886 |
| WO | 2022027162 A1 | 2/2022 | |
| WO | 2022087069 A1 | 4/2022 | |

OTHER PUBLICATIONS

"IEEE Standard for Local and Metropolitan Area Networks—Part 16: Air Interface for Fixed and Mobile Broadband Wireless Access Systems—Amendment for Physical and Medium Access Control Layers for Combined Fixed and Mobile Operation in Licensed Bands," in IEEE Std 802.16e-2005 Feb. 2006 (Year: 2006).
International Preliminary Report on Patentability—PCT/US2020/045035, The International Bureau of WIPO—Geneva, Switzerland, Feb. 17, 2022.
International Search Report and Written Opinion—PCT/US2020/045035—ISA/EPO—Oct. 21, 2020.
Korth, H F., et al., "Mobile Computing ED", Mobile Computing, Kluwer Academic Publishers, Jan. 1, 1996 (Jan. 1, 1996), US, pp. 1-21, 1, XP008160482, 195 Pages, ISBN: 978-0-7923-9697-0. p. 153-p. 160.
Shrivastava V. K., et al., "5G Evolution for Multicast and Broadcast Services in 3GPP Release 17", in IEEE Communications Standards Magazine, vol. 6, No. 3, pp. 70-76, Sep. 2022, 7 Pages.
Walke, B.H., et al., "IP Over Wireless Mobile ATM-Guaranteed Wireless QoS by HiperLAN/2", in Proceedings of the IEEE, vol. 89, No. 1, Jan. 2001, pp. 21-40, doi: 10.1109/5.904504.

* cited by examiner

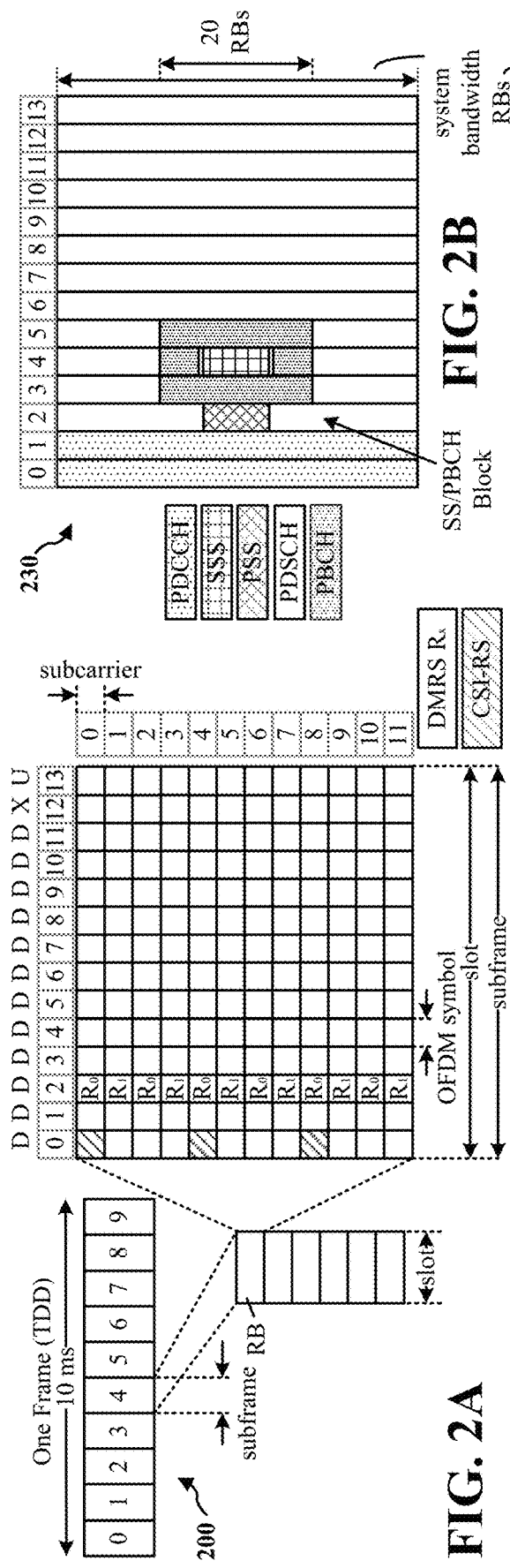
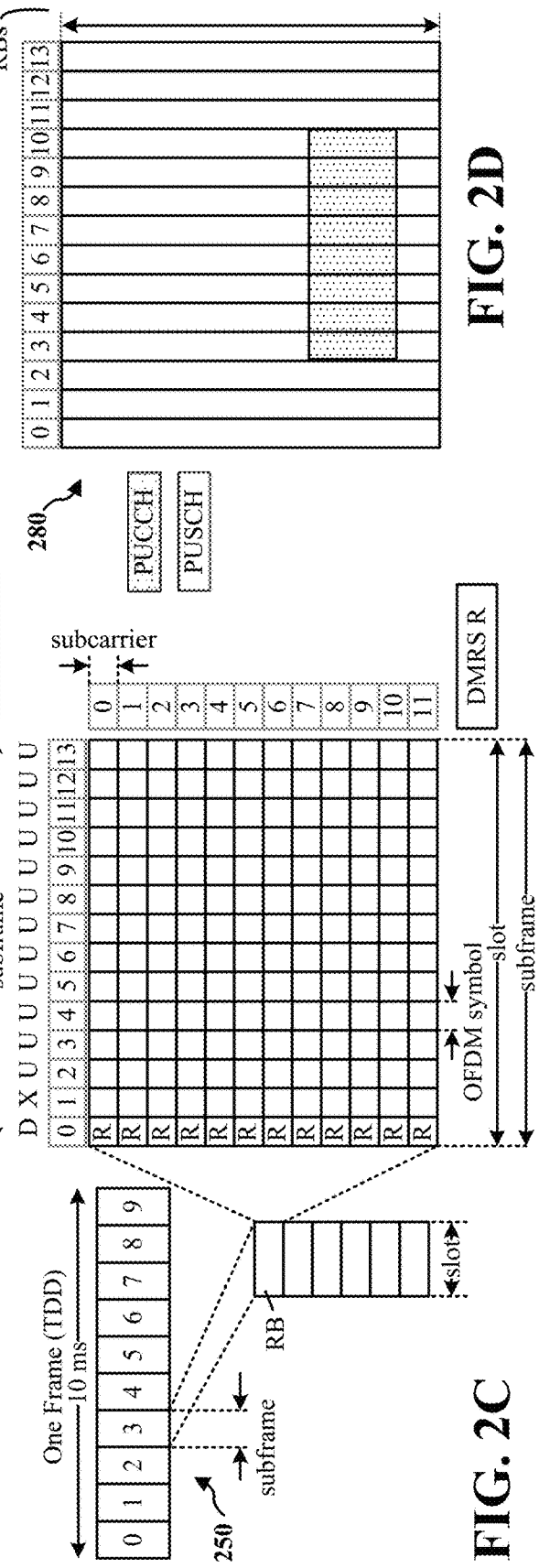
FIG. 2A
FIG. 2B
FIG. 2C
FIG. 2D

UPLINK BROADCAST/MULTICAST PACKET PROCESSING

CROSS REFERENCE TO RELATED APPLICATION(S)

This application is a Divisional of U.S. Non-provisional application Ser. No. 16/985,157, entitled "Uplink Broadcast/Multicast Packet Processing" and filed on Aug. 4, 2020, claims the benefit of U.S. Provisional Application Ser. No. 62/884,625, entitled "Uplink Broadcast/Multicast Packet Processing" and filed on Aug. 8, 2019, which are expressly incorporated by reference herein in their entirety.

TECHNICAL FIELD

The present disclosure relates generally to wireless communication, and more particularly, to processing uplink broadcast or multicast packets from a user equipment (UE) and distributing the broadcast or multicast packets to other UEs in a network.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless communication may include broadcast or multicast ("broadcast/multicast") packets that are communicated between a data network and user equipment (UE) via a wireless communication network. In some wireless technologies, a UE can send broadcast/multicast packets to the data network (DN), and the DN can be responsible for broadcasting/multicasting the packets as downlink broadcast/multicast packets to other UEs in the DN, including transmission of downlink broadcast/multicast packets back to the source UE that originally sent the uplink broadcast/multicast packet. There exists a need for further improvements in communication of broadcast/multicast packets between a network and user equipment (UE). These improvements may also be applicable to various multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication performed by a network entity. The apparatus receives an uplink packet including broadcast or multicast (broadcast/multicast) Ethernet data from a first user equipment (UE), the uplink packet being associated with a first protocol data unit (PDU) session of the first UE with a data network (DN) and transmits a downlink packet based on the uplink packet to a group of UEs including one or more second UEs, each of the second UEs having a respective PDU session with the DN.

In an aspect of the disclosure, a method, a computer-readable medium, and an apparatus are provided for wireless communication performed by a UE. The apparatus receives, from a base station, a downlink packet comprising broadcast or multicast (broadcast/multicast) Ethernet data for a protocol data unit (PDU) session of the UE with a data network (DN) associated with the base station, determines whether the downlink packet corresponds to an uplink packet comprising the broadcast/multicast Ethernet data for the PDU session previously transmitted to the base station by the UE, discards the downlink packet for the PDU session based on determining that the UE previously transmitted the corresponding uplink packet comprising the broadcast/multicast Ethernet data for the PDU session to the base station, and processes the downlink packet for the PDU session based on determining that the UE did not previously transmit the corresponding uplink packet comprising the broadcast/multicast Ethernet data for the PDU session to the base station.

To the accomplishment of the foregoing and related ends, the one or more aspects include the features hereinafter fully described and particularly pointed out in the claims. The following description and the annexed drawings set forth illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first subframe within a first 5G/new radio (NR) frame structure.

FIG. 2B is a diagram illustrating an example of downlink (DL) channels within a 5G/NR subframe.

FIG. 2C is a diagram illustrating an example of a second subframe within a 5G/NR frame structure.

FIG. 2D is a diagram illustrating an example of uplink (UL) channels within a 5G/NR subframe.

DETAILED DESCRIPTION

Figure 1:
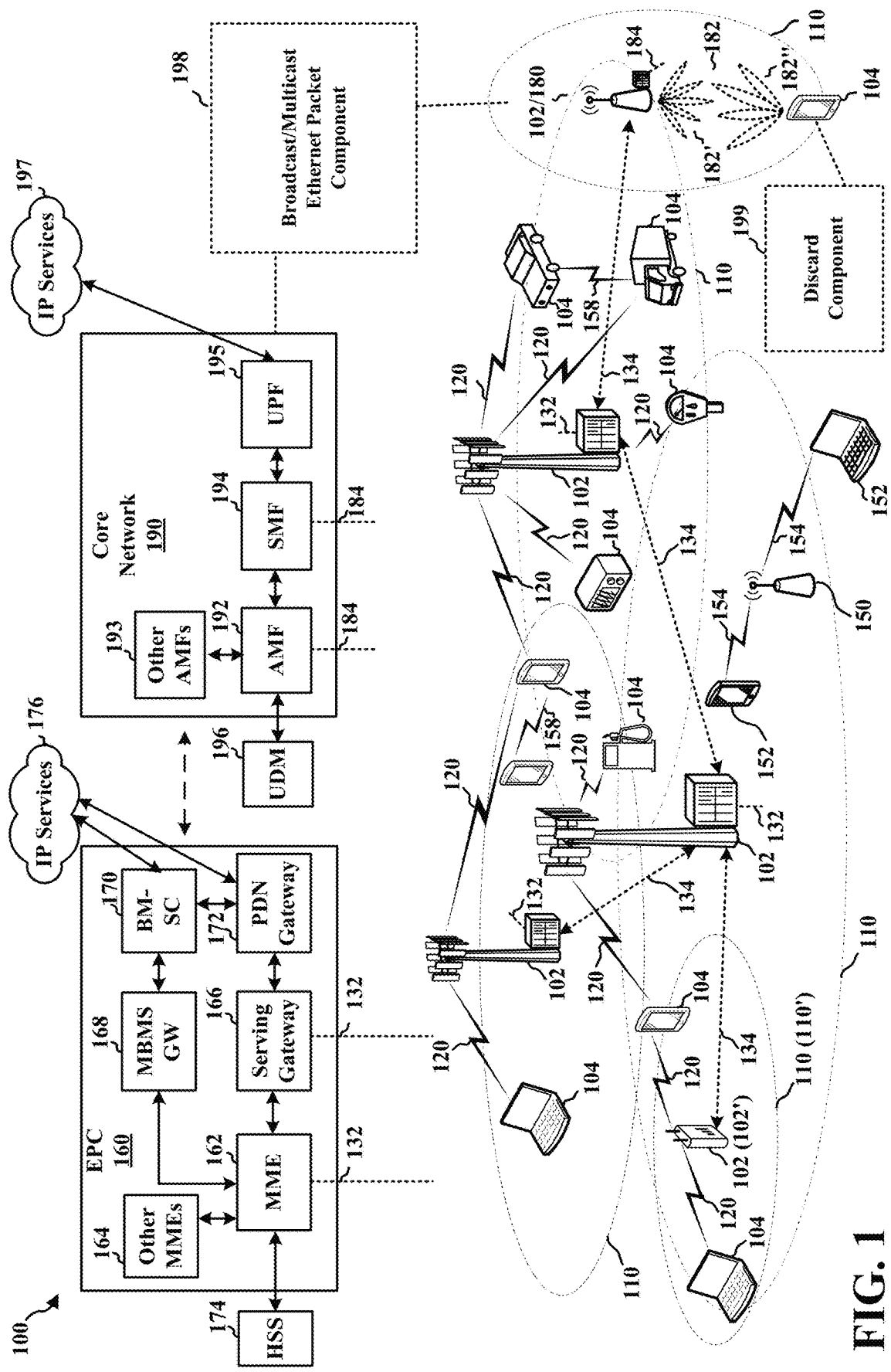
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Various aspects relate generally to processing uplink broadcast or multicast ("broadcast/multicast") packets from a user equipment (UE) and distributing the broadcast/multicast packets to other UEs in a network. In some aspects, a base station of the network may receive an uplink broadcast/multicast packet, such as a packet that includes broadcast/multicast Ethernet data, from a UE and transmit one or more downlink broadcast/multicast packets that include the broadcast/multicast Ethernet data packet using unicast or targeted multicast techniques to avoid transmitting the broadcast/multicast Ethernet data to the source UE that originally transmitted the uplink broadcast/multicast packet. In some other aspects, the base station may broadcast or multicast the broadcast/multicast packet including the broadcast/multicast Ethernet data to a group of UEs, including the source UE that originally transmitted the uplink broadcast/multicast packet. In such latter aspects, the source UE may be configured to discard or otherwise not process the broadcast/multicast packet based on determining that the broadcast/multicast packet corresponds to the uplink pack including the broadcast/multicast Ethernet data that the source UE transmitted to the base station (or underlying data network).

Particular implementations of the subject matter described in this disclosure can be implemented to realize one or more of the following potential advantages. Aspects presented herein enable more efficient handling of uplink broadcast/multicast packets, such as broadcast/multicast Ethernet packets, and the corresponding downlink transmission of the broadcast/multicast packets. The transmission of downlink broadcast/multicast packets to the source UE that originally sent the uplink broadcast/multicast packet may lead to propagation of the packets back into the network as uplink packets. Aspects presented herein avoid repeated propagation of broadcast/multicast packets by transmitting the packets in a way that avoids transmission to the source UE or by having the source UE discard packets that it originated.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as an X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example 5, 10, 15, 20, 100, or 400 MHz and so forth) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further be based on Institute of Electrical and Electronics Engineers (IEEE) 802.11 standard, and may include a Wi-Fi access point (AP) 150 in communication with Wi-Fi stations (STAs) 152 via communication links 154, for example, in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same unlicensed frequency spectrum (such as 5 GHz, or the like) as used by the Wi-Fi AP 150. The small cell 102', employing NR in an unlicensed frequency spectrum, may boost coverage to or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, or may be within the EHF band.

A base station 102, whether a small cell 102' or a large cell (for example, a macro base station), may include or be referred to as an eNB, gNodeB (gNB), or another type of base station. Some base stations, such as gNB 180 may operate in a traditional sub 6 GHz spectrum, in millimeter wave frequencies, or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP Multimedia Subsystem (IMS), a Packet Switch (PS) Streaming (PSS) Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

A PDU session may be established between a UE and a data network outside a core network (such as EPC 160, core network 190, etc.) using the wireless communication network as an access network. The PDU session may include a logical connection between the UE 104 and the data network, such as IP services 196, 197. The PDU Session can be set up between a UE 104 and a component of a core network (such as between UPF 195 and UE 104). The UE and the data network may exchange packets (for example, in the form of PDUs) that may include an IP packet. A packet format may be used for communication between the UE and the DN, for example, such that packets are tunneled via the access network. There may be various types of PDU sessions. One type of PDU session may include an Ethernet PDU session between a UE and an Ethernet DN. A UE may establish one or more PDU sessions with a same data network, as well as with multiple data networks.

Referring again to FIG. 1, in some aspects, the base station 102/180 may include a broadcast/multicast Ethernet packet component 198 configured to receive an uplink packet(s) including broadcast/multicast Ethernet data from a UE 104, the uplink packet being associated with a first protocol data unit (PDU) session of the UE with a data network (DN) and to transmit a downlink packet based on the uplink packet to one or more second UEs, each of the second UEs having a respective PDU session with the DN. UE 104 may receive a downlink packet including broadcast/multicast Ethernet data for a PDU session of the UE with a DN. In some aspects, the UE 104 may include a discard component 199 configured to determine whether the downlink packet corresponds to an uplink packet for the PDU session that was previously transmitted to a base station and to discard the downlink packet for the PDU session based at least in part on the determination. For example, this can include determining whether the downlink packet is the same as or includes the same data, parameters, etc. as the uplink packet previously transmitted to the base station by the UE. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). The description also applies to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
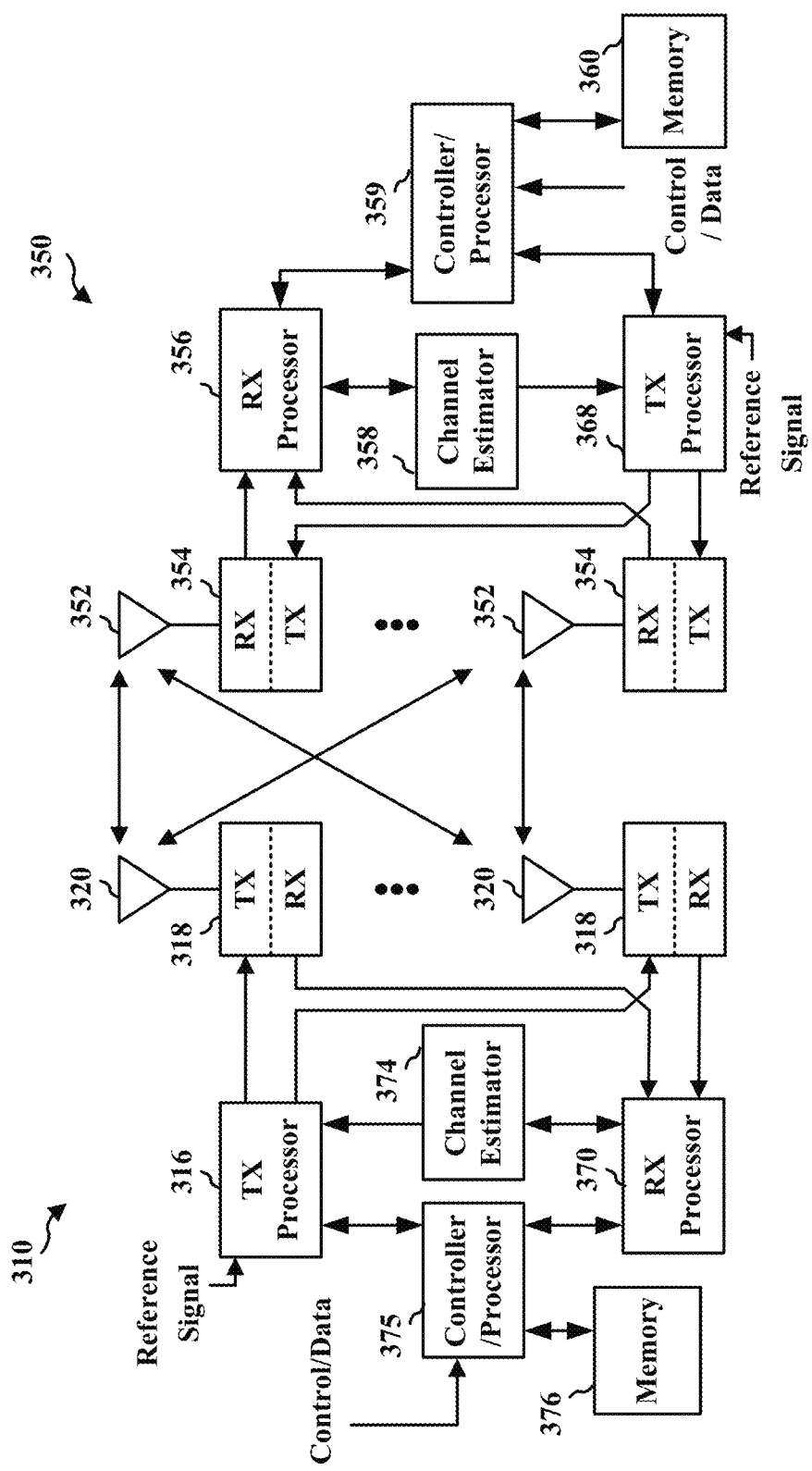
FIG. 3 is a diagram illustrating an example of a base station in communication with a user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as a MIB or SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a MIB or SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK/NACK protocol to support HARQ operations.

At least one of the TX processor 368, the RX processor 356, and the controller/processor 359 may be configured to perform aspects in connection with the discard component 199 of FIG. 1. At least one of the TX processor 316, the RX processor 370, and the controller/processor 375 may be configured to perform aspects in connection with the broadcast/multicast Ethernet packet component 198 of FIG. 1.

Figure 4A:
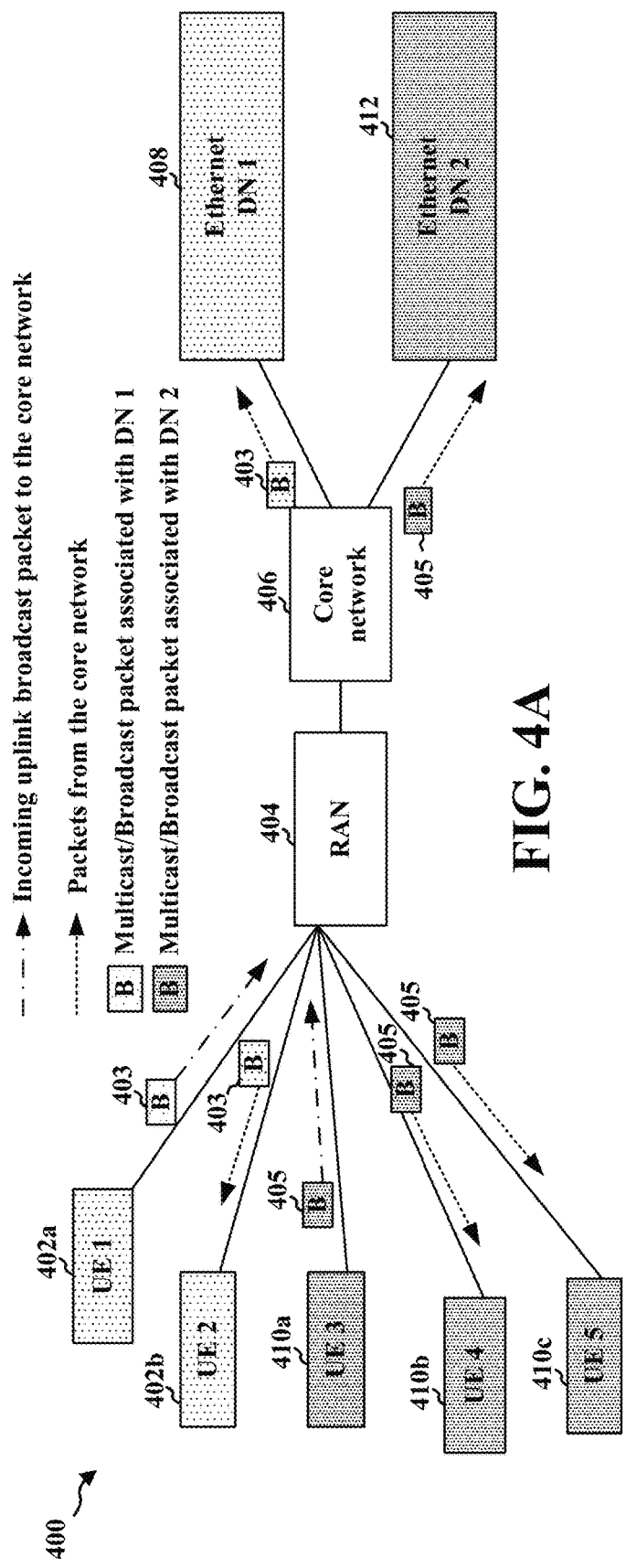
FIG. 4A illustrates an example wireless communication network that supports uplink broadcast/multicast packets for a protocol data unit (PDU) session with a data network (DN) in accordance with some aspects of the present disclosure.
Figure 4B:
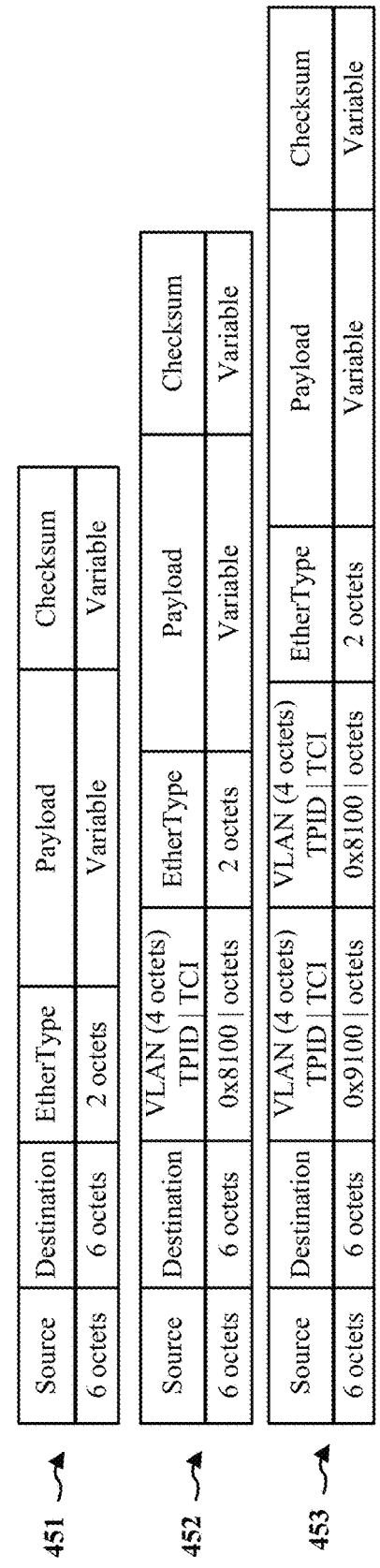
FIG. 4B illustrates an example of information fields that support broadcast/multicast packets in accordance with some aspects of the present disclosure.

FIG. 4A illustrates an example wireless communication network 400 that supports uplink broadcast/multicast packets for a PDU session with a DN. Broadcast/multicast packets, such as broadcast/multicast Ethernet packets, may originate at a DN, such as from DN 408 or DN 412, connected to a UE and may be sent over a Uu interface between the UE and a RAN. For example, a core network may process the broadcast/multicast Ethernet packets from the DN and provide the packets to the RAN for downlink transmission to the UE. Example aspects of a core network are described in connection with the EPC 160 and the core network 190 of FIG. 1. In some implementations, the core network may include a 5G core network (5GC). As illustrated in FIG. 4A, uplink broadcast/multicast packets, such as broadcast/multicast Ethernet packets (for example, packet 403), may originate from a UE 402a for a PDU session with DN 408 and may be sent to the DN 408 via a RAN 404 and the core network 406. The core network 406 and the RAN 404 may then handle the transmission of the packet(s) from the DN 408 that are based on the uplink packet(s) from the UE 402a. For example, the RAN 404 may transmit the packets 403 as broadcast/multicast Ethernet packets to one or more other UEs having PDU sessions with the DN. FIG. 4A illustrates an example in which the UE 402a sends the packet(s) 403 as an uplink packet to a RAN 404, for communication to the DN 408 via the core network 406. As an example, the uplink broadcast/multicast Ethernet packet may be sent to the RAN 404 via unicast, multicast, or broadcast. As used herein, a broadcast/multicast Ethernet packet can refer to a type of packet sent using PDU sessions, such as an Ethernet PDU session. Although the type of packet is referred to as a "broadcast/multicast Ethernet" packet or more simply a "broadcast/multicast" packet, the packet may be transmitted over the PHY and transport logical layers using unicast, multicast or broadcast between a RAN and a UE, or vice versa. As an example, broadcast/multicast Ethernet packets may refer to packets for a PDU session of a UE with a DN. The type may be indicated in one or more packet fields, such as at least one of a destination MAC address or an EtherType field. FIG. 4B illustrates an example in which the EtherType field may indicate that the packet is a broadcast/multicast Ethernet packet.

Uplink broadcast/multicast packets from a PDU session of a UE, such as UE 402a or 410a, may be sent to a UPF of a core network 406, or an Ethernet adaptor connected to a UPF of a core network 406 (such as the UPF 195 in FIG. 1), before being sent to an Ethernet DN, such as DN 408, associated with the PDU session. Thus, the uplink packet 403 or 405 may be sent to the DN 408 or the DN 412 outside the core network 406. FIG. 1 illustrates an example UPF 195 as a component of a core network 190. The DN 408 or 412 may then send the packet 403 or 405 back to the core network 406 for other PDU sessions. FIG. 4A illustrates that the RAN 404 and the core network 406 may handle multiple uplink broadcast/multicast Ethernet packets, such as 403 or 405, from different UEs, for example from UE 402a or UE 410a, for different PDU sessions with different DNs, such as with DN 408 and DN 412. Additionally, individual UEs may have multiple PDU sessions with a same DN or with different DNs. For example, UE 402a may have multiple PDU sessions with DN 408 and may have additional PDU session(s) with DN 412.

Examples of uplink broadcast packets include packets for address resolution protocol (ARP) and neighbor discovery protocol, among other examples. Examples of uplink multicast packets include packets for precision time protocol (PTP) and spanning tree protocol (STP), among other examples. FIG. 4B illustrates example information field that support broadcast/multicast packets. The fields may be included in a broadcast/multicast packet, such as a broadcast/multicast Ethernet packet. Each of examples fields 451, 452, and 453 are shown as including information about a source (for example, a source address) of the broadcast/multicast packet, a destination for the broadcast/multicast packet (for example, a destination address), a payload, an EtherType, and a checksum. For an uplink broadcast/multicast packet, the source is the UE sending the uplink packet. For example, the UE 402a is the source of packet 403, and the UE 410a is the source of packet 405. The destination is the corresponding DN, such as the DN 408 or the DN 412. The EtherType information indicates the type of packet. For example, the EtherType information may identify the packet as a broadcast/multicast Ethernet packet. The payload may include information that indicates the PDU session of the UE with the DN along with a payload. The example fields 452 further include a virtual local area network (VLAN) identifier (ID). A VLAN ID (VID) may indicate at least one of a tag protocol identifier (TPID) or tag control information (TCI). The example fields 453 further include a second VID.

An uplink broadcast packet that arrives without a VID from a PDU session to an Ethernet DN, such as the example fields 451 in FIG. 4B, may be broadcast on a DN level. The DN may send the packet to the core network 406 and the RAN 404 for transmission to all UEs with PDU sessions with the Ethernet DN. For example, if a packet 403 is sent as an uplink packet without a VID, the DN 408 may return the packet to the core network 406 and the RAN 404 for transmission to all the UEs having PDU sessions with the DN 408, for example UE 402a, UE 402b. Similarly, the DN 412 may return such a packet (for example, packet 405) for transmission to the UEs 410a, 410b, and 410c. In some examples, the network may transmit the broadcast/multicast packet as a downlink transmission to the UEs with PDU sessions with the DN except the source PDU session, such as excluding the PDU session of UE 402a that originated packet 403 from the downlink transmission of packet 403 or excluding the PDU session of UE 410a from the downlink transmission of packet 405.

An uplink broadcast packet that includes a VID from a PDU session, such as in example fields 452 or 453 in FIG. 4B, may be multicast on a VID level. The DN may send the broadcast/multicast packet back to all PDU sessions to the DN with the limitation that the receiving UEs associated with the PDU session have a membership to the VID. The network may distribute the broadcast/multicast packet to the UEs having the PDU sessions with the DN and associated with the VID except for the source PDU session. For example, the multicast may exclude the PDU session of UE 402a that originated packet 403 from the downlink transmission of packet 403 or exclude the PDU session of UE 410a from the downlink transmission of packet 405.

The network may multicast uplink broadcast/multicast Broadcast/multicast packets with a multicast address and EtherType associated with a specific application (for example, a PTP/generic PTP (gPTP)), on an application level. The network may restrict the downlink transmission of the broadcast/multicast packet to a subset of PDU sessions within the DN or to a VID based group. As with the other examples, the transmission may exclude the source PDU session, such as excluding the PDU session of UE 402a that originated the packet 403 from the downlink transmission of broadcast/multicast packet 403 or excluding the PDU session of UE 410a from the downlink transmission of broadcast/multicast packet 405.

Various aspects relate generally to processing uplink broadcast or multicast ("broadcast/multicast") packets from a user equipment (UE) and distributing the broadcast/multicast packets to other UEs in a network. In some aspects, a base station of the network may receive an uplink broadcast/multicast packet, such as a packet that includes broadcast/multicast Ethernet data, from a UE and transmit one or more downlink broadcast/multicast packets that include the broadcast/multicast Ethernet data packet using unicast or targeted multicast techniques to avoid transmitting the broadcast/multicast Ethernet data to the source UE that originally transmitted the uplink broadcast/multicast packet. In some other aspects, the base station may broadcast or multicast the broadcast/multicast packet including the broadcast/multicast Ethernet data to a group of UEs, including the source UE that originally transmitted the uplink broadcast/multicast packet. In such latter aspects, the source UE may be configured to discard or otherwise not process the broadcast/multicast packet based on determining that the broadcast/multicast packet corresponds to the uplink pack including the broadcast/multicast Ethernet data that the source UE transmitted to the base station (or underlying data network).

Particular implementations of the subject matter described in this disclosure can be implemented to realize one or more of the following potential advantages. Aspects presented herein enable more efficient handling of uplink broadcast/multicast packets, such as broadcast/multicast Ethernet packets, and the corresponding downlink transmission of the broadcast/multicast packets. The transmission of downlink broadcast/multicast packets to the source UE that originally sent the uplink broadcast/multicast packet may lead to propagation of the packets back into the network as uplink packets. Aspects presented herein avoid repeated propagation of broadcast/multicast packets by transmitting the packets in a way that avoids transmission to the source UE or by having the source UE discard packets that it originated.

Figure 5:
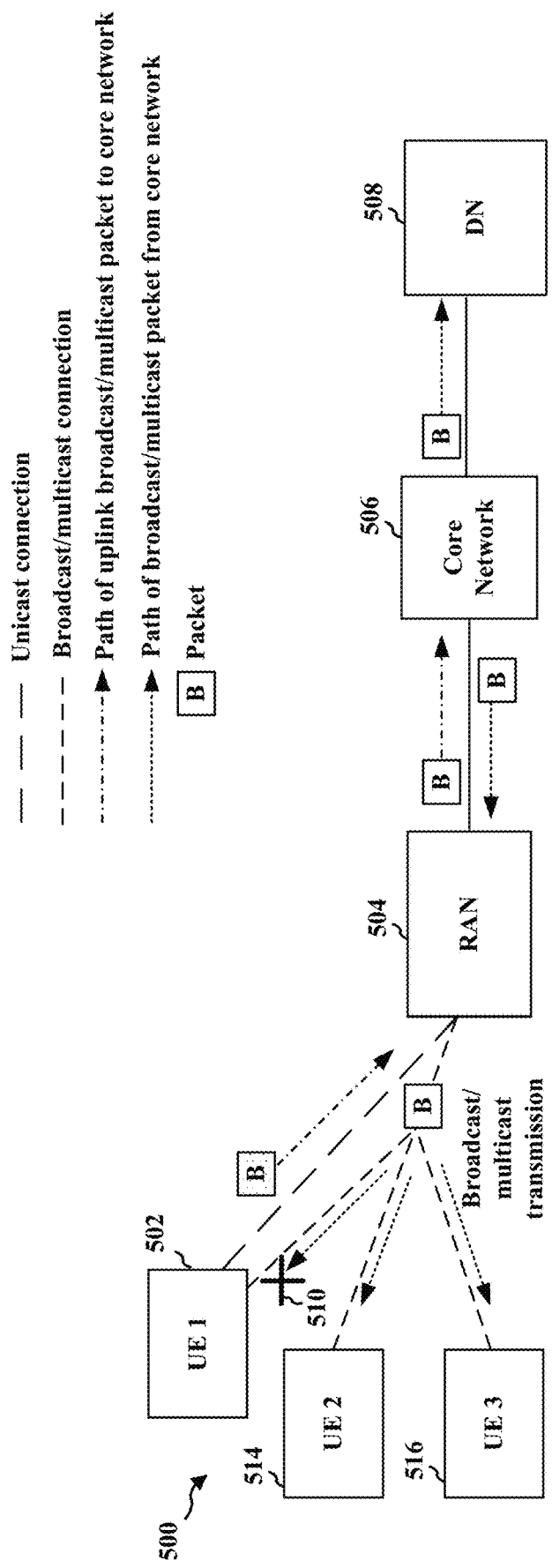
FIG. 5 illustrates an example of a wireless communication network that supports uplink broadcast/multicast packets for a PDU session with a DN and corresponding broadcast/multicast downlink packets in accordance with some aspects of the present disclosure.

FIG. 5 illustrates an example of a wireless communication network 500 that supports uplink broadcast/multicast packets for a PDU session with a DN and corresponding broadcast/multicast downlink packets. FIG. 5 illustrates an example in which the UE 502 transmits an uplink broadcast/multicast packet, such as a broadcast/multicast Ethernet packet, for a PDU session with the DN 508. The RAN 504 receives the uplink broadcast/multicast packet and provides the broadcast/multicast packet to the core network 506 that provides the broadcast/multicast packet to the DN 508. The core network 506 (or components thereof, such as a UPF or a Network side time sensitive networking (TSN) translator (NW-TT)) may return the packet for transmission to the UEs having PDU sessions with the DN (such as a DN level broadcast, a VID level multicast, an application level multicast, among other examples). FIG. 5 illustrates the broadcast/multicast packet transmitted from the RAN as a downlink transmission that is broadcast or multicast to the UEs 502, 514, and 516. However, if the UE 502 receives and processes the packet, the UE 502 may waste processing power, because the information in the packet is originally from the UE 502. As well, the UE 502 may propagate a copy of the packet back to the network. In addition to the wasteful use of wireless resources for an additional uplink transmission of the copy, the copy may cause additional processing by the RAN, the core network, and the DN. The copy may also lead to additional downlink transmissions. Thus, receipt of the broadcast/multicast packet or processing of the broadcast/multicast packet by the UE 502 may lead to inefficient processing of packets or wasteful transmissions of redundant copies of the packet through the network. It may be beneficial to avoid the UE 502 receiving the downlink packet for a PDU session of the UE 502 that originated the uplink packet or for the UE 502 to discard the downlink packet without processing the downlink packet for the PDU session of the UE 502 that originated the uplink packet, such as indicated at 510 in FIG. 5.

Figure 6:
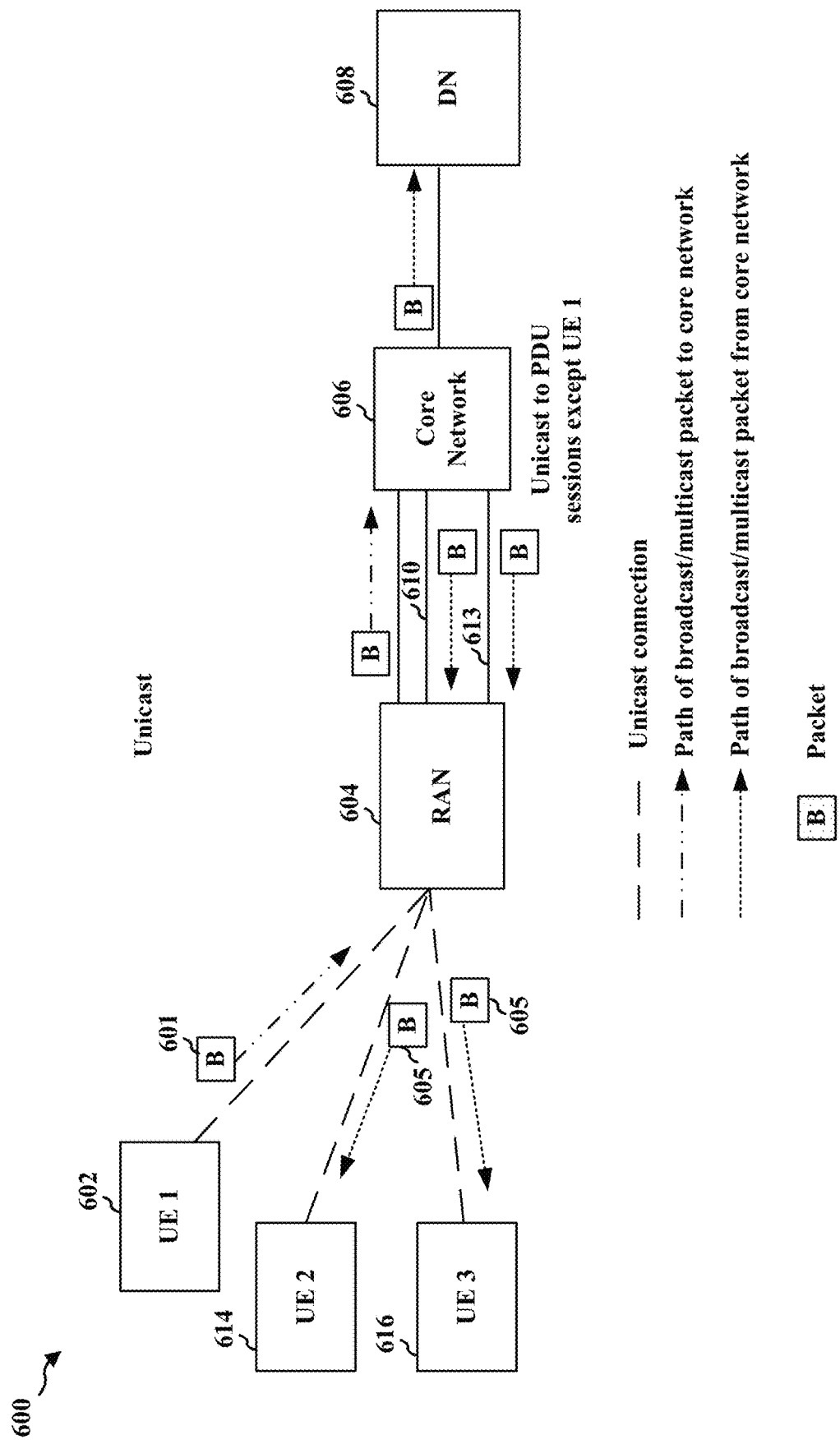
FIG. 6 illustrates an example of wireless communication including uplink broadcast/multicast packets for a PDU session with a DN and unicast of a corresponding downlink packet in accordance with some aspects of the present disclosure.

FIG. 6 illustrates an example of a wireless communication network 600 including uplink broadcast/multicast packets for a PDU session with a DN and unicast of a corresponding downlink packet. FIG. 6 illustrates an example that avoids downlink transmission of a broadcast/multicast packet, such as a broadcast/multicast Ethernet packet, to the PDU session of the UE 602 that originated the uplink broadcast/multicast packet through the core network 606 or the RAN 604 sending a unicast transmission of the downlink broadcast/multicast packet to the UEs having a PDU session with the DN 608, for example, to the UE 614 and the UE 616. In this example, the network does not send the downlink broadcast/multicast packet to the UE 602. In an example in which the uplink packet 601 is for PDU session P with the DN 608, a UPF or a NW-TT at the core network 606 may send the downlink broadcast/multicast packet 605 via PDU sessions for the DN 608 for one or more UEs associated with the core network 606 except PDU session P of UE 602. As illustrated in FIG. 6, unicasting the downlink broadcast/multicast packet may involve use of an individual tunnel 610 and 613 between the core network 606 and the RAN 604 for the UE 614 and the UE 616. While the core network 606 or the RAN 604 may avoid sending the downlink broadcast/multicast packet 605 to PDU session P of UE 602, the network may send the downlink packet to any other PDU session of the UE 602. Multiple sessions of the same UE may be associated with the same DN. For example a PDU session may be established per UE port.

Figure 7:
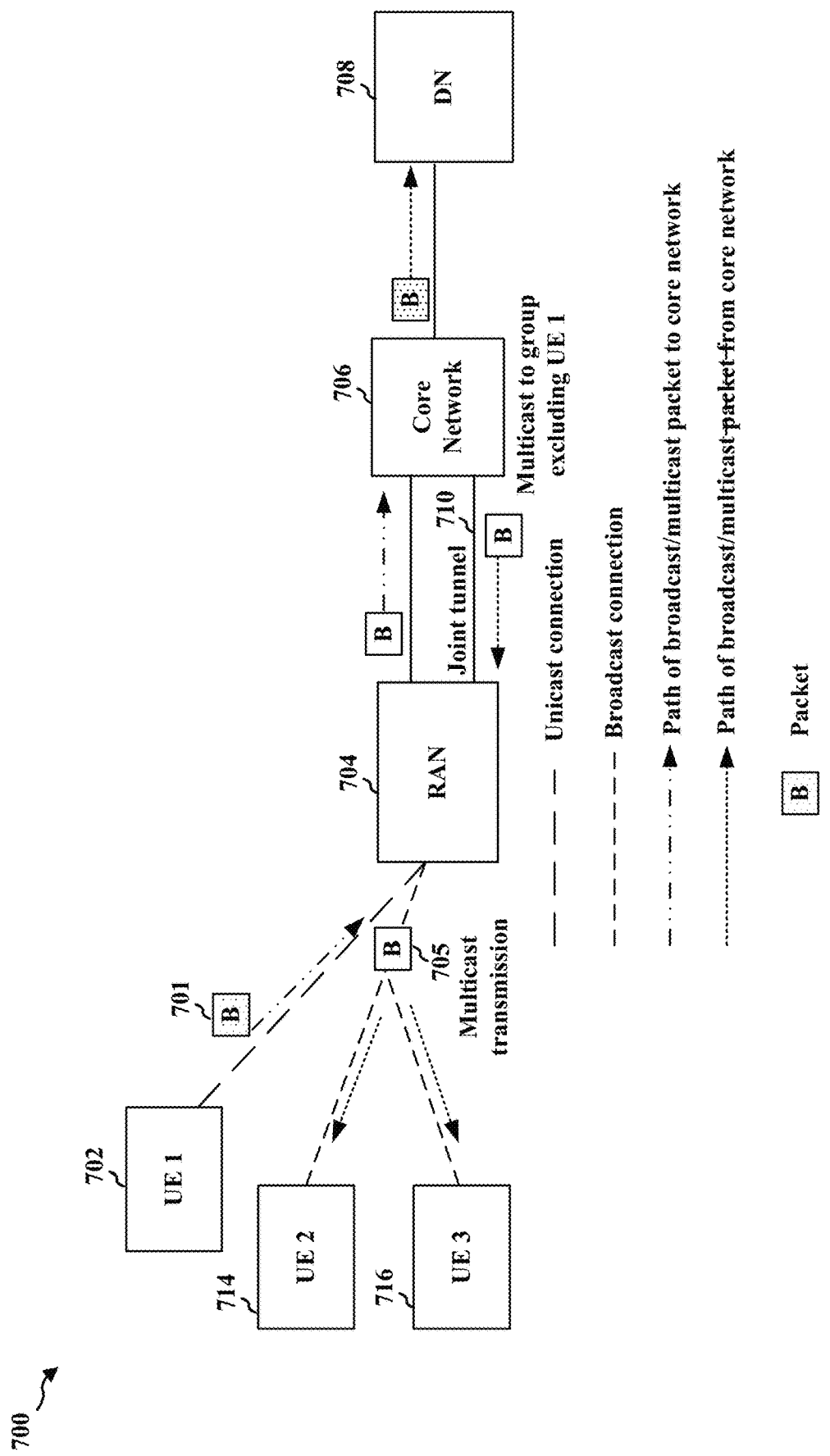
FIG. 7 illustrates an example of wireless communication including uplink broadcast/multicast packets for a PDU session with a DN and targeted multicast of a corresponding downlink packet in accordance with some aspects of the present disclosure.

FIG. 7 illustrates an example of a wireless communication network 700 with communication including uplink broadcast/multicast packets 701 for a PDU session with a DN and targeted multicast of a corresponding downlink packet. FIG. 7 illustrates an example that avoids downlink transmission of a broadcast/multicast packet, such as a broadcast/multicast Ethernet packet, to the PDU session of the UE 702 that originated the uplink packet through the core network 706 or the RAN 704 sending a targeted multicast transmission of the downlink packet to the UEs having a PDU session with the DN 708 and excluding the UE 702. The core network and the RAN may multicast the downlink broadcast/multicast packet 705 to one or more UEs groups that do not include UE 702. FIG. 7 illustrates a multicast to a group including UE 714 and UE 716. Multicasting to a group of UEs may include at least one of sending the broadcast/multicast packet from the core network 706 to the RAN 704 using a single tunnel 710 or transmitting the packet from the RAN 704 to the UEs (such as the UE 714 and the UE 716) using a joint transmission. Targeted multicast by the network may include the creation and maintenance of a multicast group per UE. For example, for each UE, a multicast group can be formed that excludes that UE (such as UE 702 in the example in FIG. 7) in order to handle downlink transmissions corresponding to uplink packets from that UE.

In some aspects, rather than avoid transmission to the PDU session of the UE that transmitted the uplink broadcast/multicast packet, the network may rely on the UE to discard a downlink broadcast/multicast packet that corresponds to a previous uplink broadcast/multicast packet. Thus, some aspects may include broadcasting/multicasting a downlink packet to a group of UEs including the UE that originated the uplink packet along with a UE-based discarding of the downlink broadcast/multicast packet. In the example illustrated in FIG. 5, upon receiving a broadcast/multicast packet from the UE 502 via a PDU session P for the DN 508, the core network 506 (such as a UPF of the core network 506) or the RAN 504 may multicast the broadcast/multicast packet to a UE group including the UEs 502, 514, and 516.

In some aspects, the UE 502, or a device-side TSN translator (DS-TT) of the UE 502, may store information about uplink broadcast/multicast packets transmitted by the UE 502. For example, the UE 502 may maintain a list or other identification including information for each PDU session of the UE 502. The list may identify the uplink broadcast/multicast packets transmitted by the UE 502 for a corresponding PDU session of the UE 502. For each uplink packet identified in the list, the information may include any of a source MAC address for the uplink packet, a VID for the uplink packet, a destination MAC address for the uplink packet, other header field(s) for the uplink packet, a function of one or more fields of a corresponding uplink packet (such as a hash function or other function), one or more bytes (such as the first n bytes) of non-header field(s) of the uplink packet, or one or more fields in a suffix for the uplink packet. The UE may continually update the list or other identification as new uplink broadcast/multicast packets are transmitted by the UE 502. The UE may remove older entries from the list or other identification. For example, entries in the list may age out, for example, using a timer, and the UE may remove an entry from the list based on expiration of the timer. As an example, the timer may be set based on a network configuration. The UE may receive the network configuration in NAS signaling, for example. The UE 502 may use the information stored at the UE 502 to discard downlink broadcast/multicast packets that the UE 502 has previously seen. The UE 502 may discard downlink broadcast/multicast packets with information that matches the information stored at the UE 502. For example, the UE 502 may discard, not use, or not process, downlink broadcast/multicast packets on a port having a same MAC address as an entry on the list maintained by the UE 502. The UE 502 may discard the packet based on discard criteria that is used to identify whether the packet originated from UE 502. If the UE 502 has multiple PDU sessions with the DN 508, the UE 502 may determine to keep or process the downlink broadcast/multicast packet for a different PDU session even if the downlink packet is based on an uplink broadcast/multicast packet transmitted by the UE 502 for a first PDU session with the DN 508. For example, the downlink packet based on the uplink packet can refer to the downlink packet being the same as the uplink packet, the downlink packet having the same data content as the uplink packet, the downlink packet having the same parameters as the uplink packet, or any association between the downlink packet and the uplink packet.

In some aspects, the network may assist the UE in determining whether to discard a packet. For example, the UE 502 may determine to discard, not process, or not use, a downlink broadcast/multicast packet using uplink packet information that the UE 502 receives from the wireless network. For example, the core network 506 may store information about the uplink broadcast/multicast packet transmissions from the UE 502 and may provide the information to the UE 502. Similar to the example in which the UE 502 maintains information about the uplink packets, the core network 506 may maintain a list or other identification including information for each PDU session of UE 502. The list may identify the uplink broadcast/multicast packets transmitted by the UE 502 for a corresponding PDU session of UE 502. For each uplink packet identified in the list, the information may include any of a source MAC address for the uplink packet, a VID for the uplink packet, a destination MAC address for the uplink packet, other header field(s) for the uplink packet, a function of one or more fields of a corresponding uplink packet (such as a hash function or other function), one or more bytes (such as the first n bytes) of non-header field(s) of the uplink packet, or one or more fields in a suffix for the uplink packet. The information (such as a list) may be maintained by any of a UPF, an NW-TT, an SMF, or an AMF of the core network 506. A network entity, such as any of the SMF, the UPF, the NW-TT, or the AMF of the core network 506, may transmit the list or other identification to the UE 502 for use in filtering out downlink broadcast/multicast packets based on previously transmitted uplink broadcast/multicast packets.

Although the example is described in connection with the broadcast/multicast transmission of the packet from the network to a group of UEs including the UE 502, the UE 502 may similarly use the aspects described in connection with FIG. 5 to discard a broadcast/multicast packet received in a downlink unicast transmission from the network that corresponds to a previous uplink broadcast/multicast packet from the UE 502.

Figure 8:
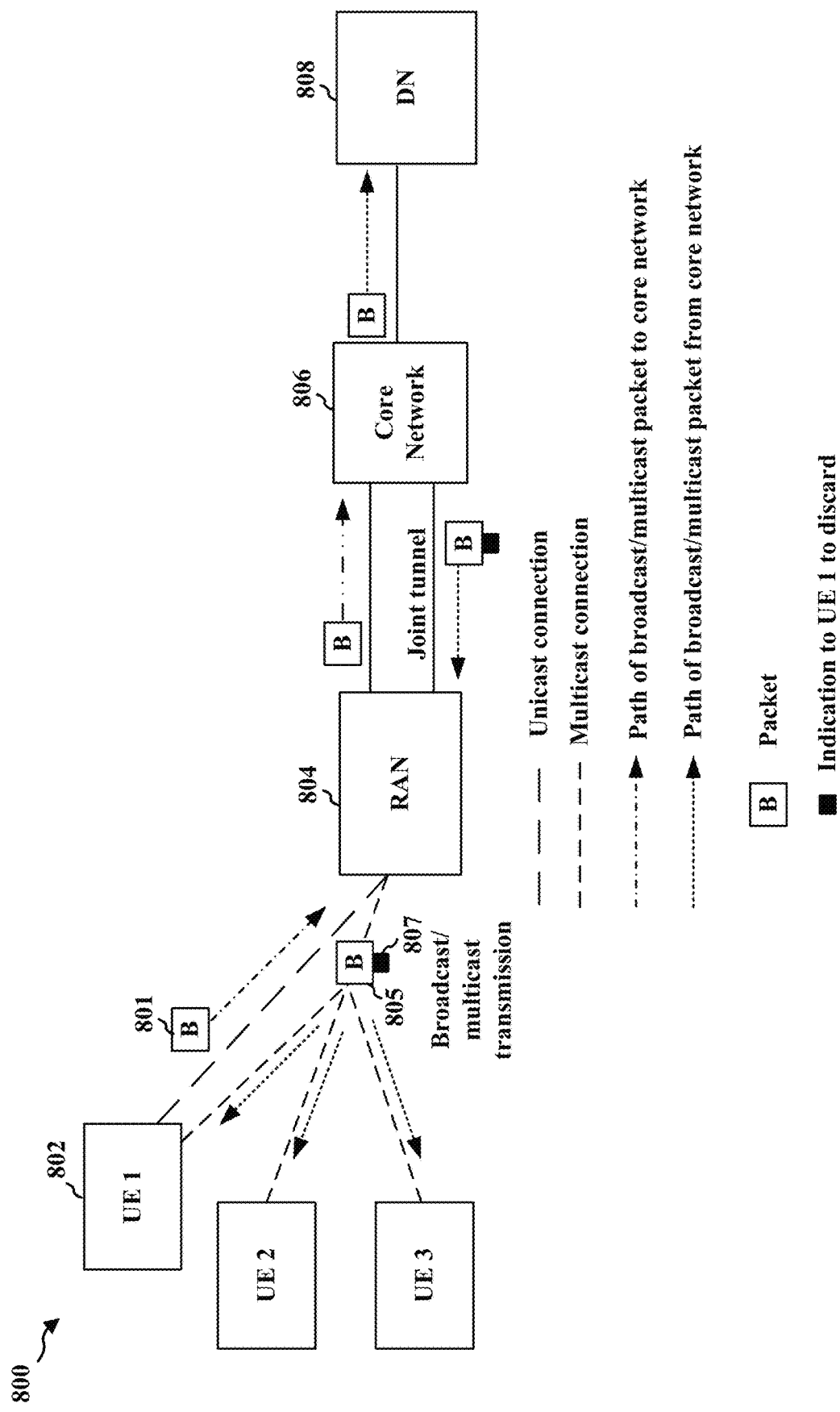
FIG. 8 illustrates an example of wireless communication network with communication including uplink broadcast/multicast packets for a PDU session with a DN and broadcast/multicast of a corresponding downlink packet with information in accordance with some aspects of the present disclosure.

FIG. 8 illustrates an example of a wireless communication network 800 with communication including uplink broadcast/multicast packets for a PDU session with a DN and broadcast/multicast of a corresponding downlink packet with information. FIG. 8 illustrates an example in which the network may provide a discard indication that can be used by the UE that originated the broadcast/multicast packet, such as the UE 802, to determine to discard the packet for a PDU session of the UE 802. In FIG. 8, the UE 802 sends a broadcast/multicast packet 801 as an uplink transmission to the RAN 804 and the core network 806 for a PDU session (such as PDU session P) with the DN 808. Based on receiving a broadcast/multicast packet 805 for the downlink transmission (based on packet 801), the core network 806 and the RAN 804 may multicast or broadcast, the packet 805 to a multicast group including UE 802 and may provide an indication for the UE 802 to not use or not process the packet for PDU session P. The indication may be provided, such as by a UPF or a NW-TT of the core network 806. The indication may be included, such as in a header field of a PDU including the packet 805 when the RAN 804 broadcasts/multicasts the packet 805. FIG. 8 illustrates an indication 807 that is transmitted in connection with the packet 805. When the UE 802 receives the packet 805, the UE 802 may discard the packet 805 for PDU session P based on the discard indication 807 from the core network 806 and the RAN 804. The UE 802 may use the packet 805 for PDU sessions other than PDU session P.

Figure 9:
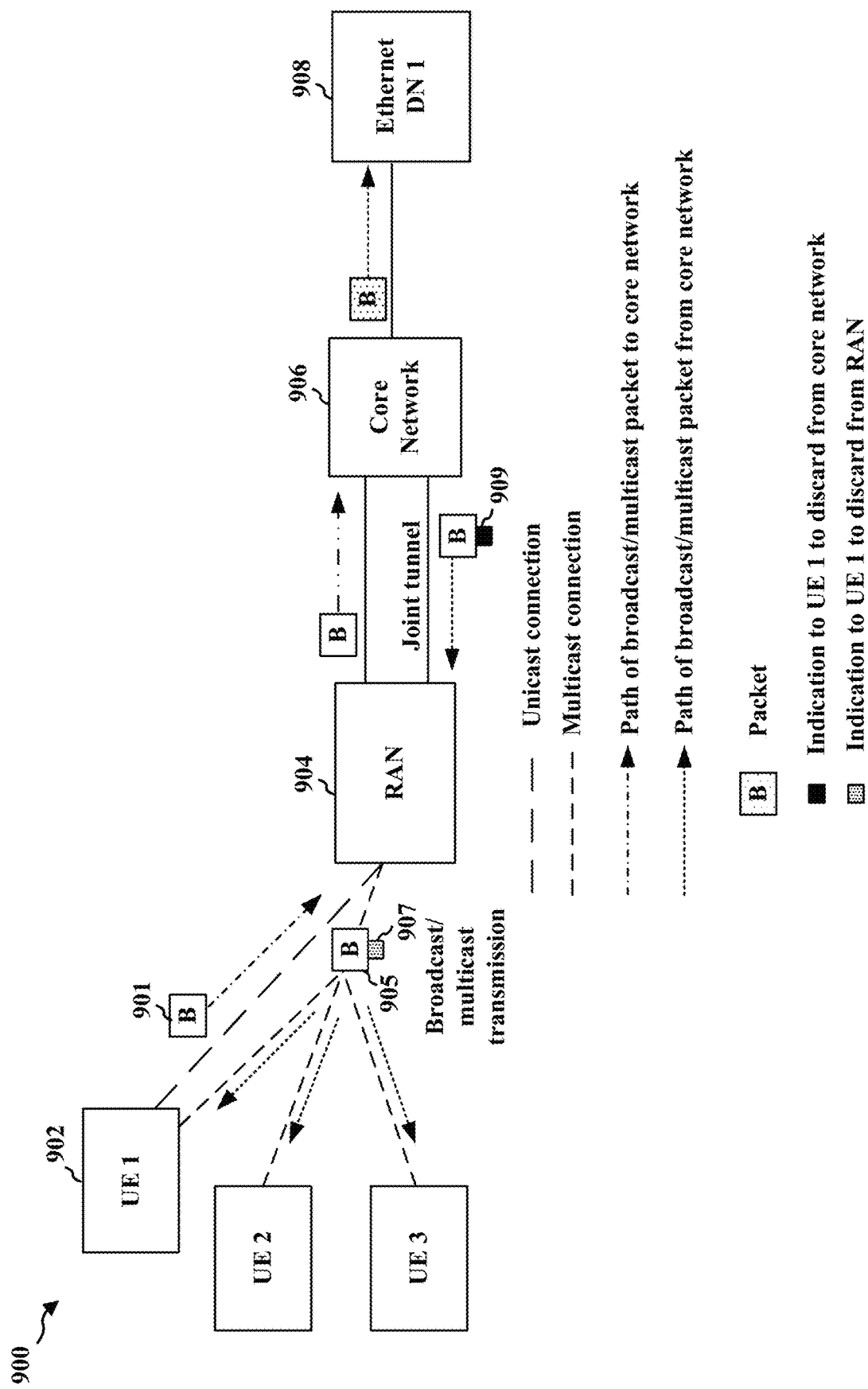
FIG. 9 illustrates an example of wireless communication network with communication including uplink broadcast/multicast packets for a PDU session with a DN and broadcast/multicast of a corresponding downlink packet with information in accordance with some aspects of the present disclosure.

FIG. 9 illustrates an example of a wireless communication network 900 with communication including uplink broadcast/multicast packets for a PDU session with a DN and broadcast/multicast of a corresponding downlink packet with information. FIG. 9 illustrates an example similar to the example in FIG. 8, in which the RAN 904 may generate an indication 907 that is based on an indication 909 from a core network 906. The indication 907 may be included in a header field associated with the broadcast/multicast packet 905 and may indicate to UE 902 to not use the packet 905 for a PDU session with the DN 908. For example, UE 902 may have transmitted the uplink broadcast/multicast packet 901 for PDU session P with the DN 908. The indication 907 may inform the UE 902 not to use the packet 905 (that is based on packet 901) for PDU session P. The UE 902 may use the packet 905 for another PDU session. As an example, the indication 907 may be added by a PDCP layer, an SDAP layer, or another layer of the RAN 904 based on the indication 909 that the RAN 904 receives from the core network 906. The indication 909 may be from a UPF or a NW-TT of the core network 906.

Figure 10:
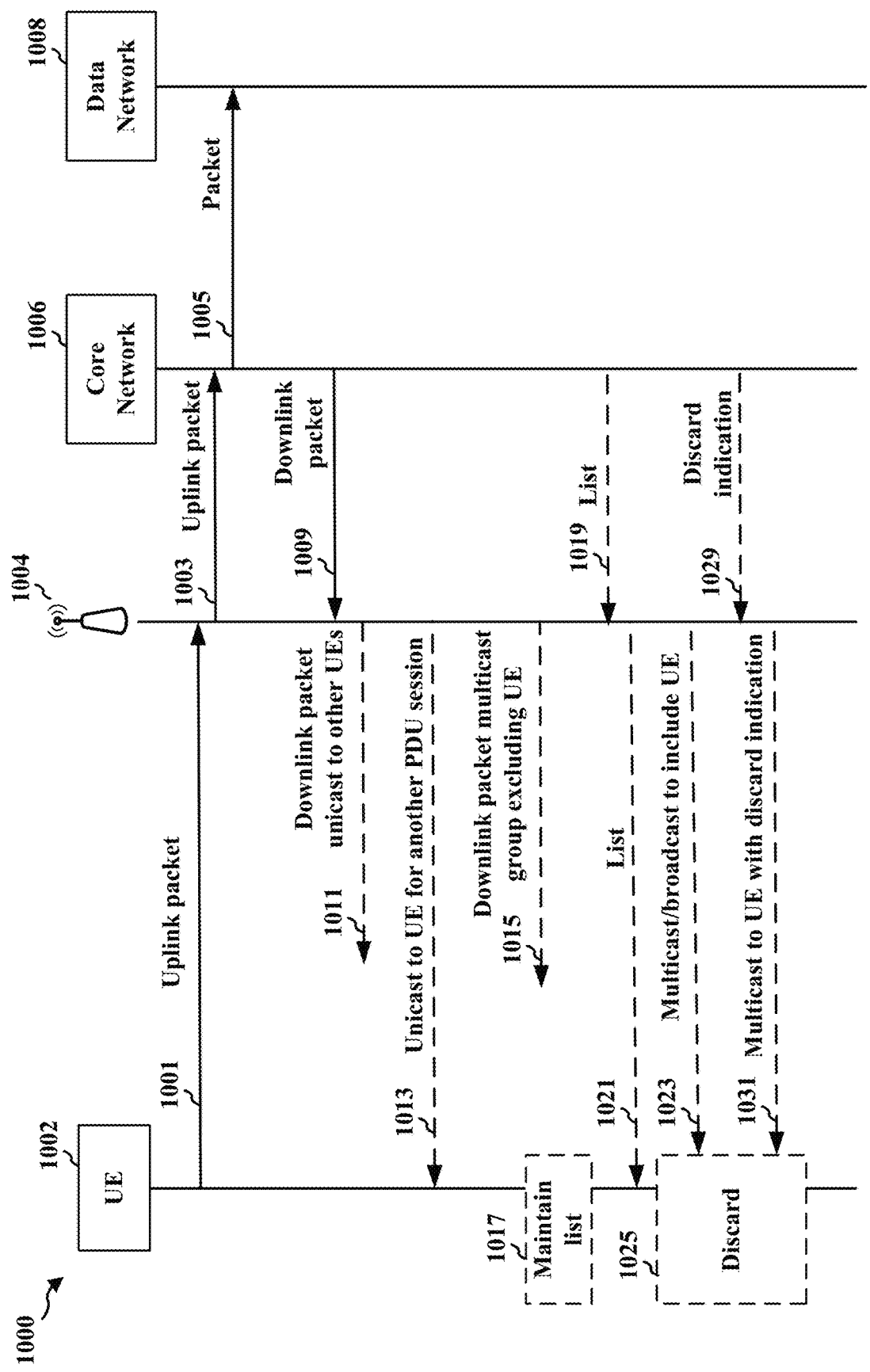
FIG. 10 is an example communication flow involving a UE and a network that supports multicast/broadcast packets in accordance with some aspects of the present disclosure in accordance with some aspects of the present disclosure.

FIG. 10 is an example of a communication flow 1000 involving a UE 1002 and a network that supports multicast/broadcast packets in accordance with some aspects of the present disclosure. FIG. 10 illustrates the communication flow 1000 between the UE 1002, a RAN 1004, a core network 1006, and a DN 1008. Optional aspects are illustrated with a dashed line. As described in connection with any of FIGS. 4-9, the UE 1002 may have a PDU session with the DN 1008 and may transmit uplink broadcast/multicast packets, such as broadcast/multicast Ethernet packets, 1001 to the DN 1008. The RAN 1004 may provide the broadcast/multicast packet(s) 1003 to the core network 1006 that may provide the broadcast/multicast packet(s) 1005 to the DN 1008. The DN 1008 may process the uplink broadcast/multicast packet(s) 1005. The core network 1006 may return the broadcast/multicast packet(s) 1009 for transmission to one or more UEs. The core network 1006 may provide the packet(s) 1009 to the RAN 1004, and the RAN 1004 may transmit the packets to the one or more UEs.

As described in connection with FIG. 6, the RAN 1004 may transmit the packet(s), at 1011, by unicasting the packet(s) to each of the one or more UEs and excluding the PDU session of the UE 1002 that originated the uplink packet 1001. The RAN 1004 may unicast the packet(s) to the UE 1002 for a different PDU session, at 1013. As illustrated at 1015, the RAN 1004 may transmit the packets as a multicast to a UE group excluding the UE 1002, as described in connection with FIG. 7. The RAN 1004 may transmit the packet(s) by multicast/broadcast to a group that includes the UE 1002, as illustrated at 1023. As described in connection with FIG. 5, the UE 1002 may discard the packet(s) based on information regarding previous uplink packets. For example, at 1017, the UE 1002 may maintain information, such as a list, about previous uplink transmissions and may compare received packet(s) 1023 to the stored information in order to determine whether to discard the received packet(s). Also, as described in connection with FIG. 5, the core network 1006 may provide information, such as the list 1019, to the UE 1002 for use in determining which packets to discard. The RAN 1004 may provide the information about previous uplink packets to the UE 1002, such as a list 1021.

As illustrated at 1025, the UE 1002 may discard the multicast/broadcast packets that correspond to an uplink broadcast/multicast packet that was originally transmitted by the UE 1002. As described in connection with FIGS. 8 and 9, the core network 1006 may provide a discard indication 1029 to inform the UE 1002 to discard the packet(s) that were originated by the UE 1002. The RAN 1004 may forward the indication to the UE 1002 as described in connection with FIG. 8 or may generate an indication for the UE 1002 based on indication 1029 from the core network 1006, as described in connection with FIG. 9. Thus, at 1031, the RAN 1004 may multicast/broadcast the packet(s) to a group including the UE 1002 and may send an indication that enables the UE 1002 to determine whether to discard the packet(s).

Figure 11:
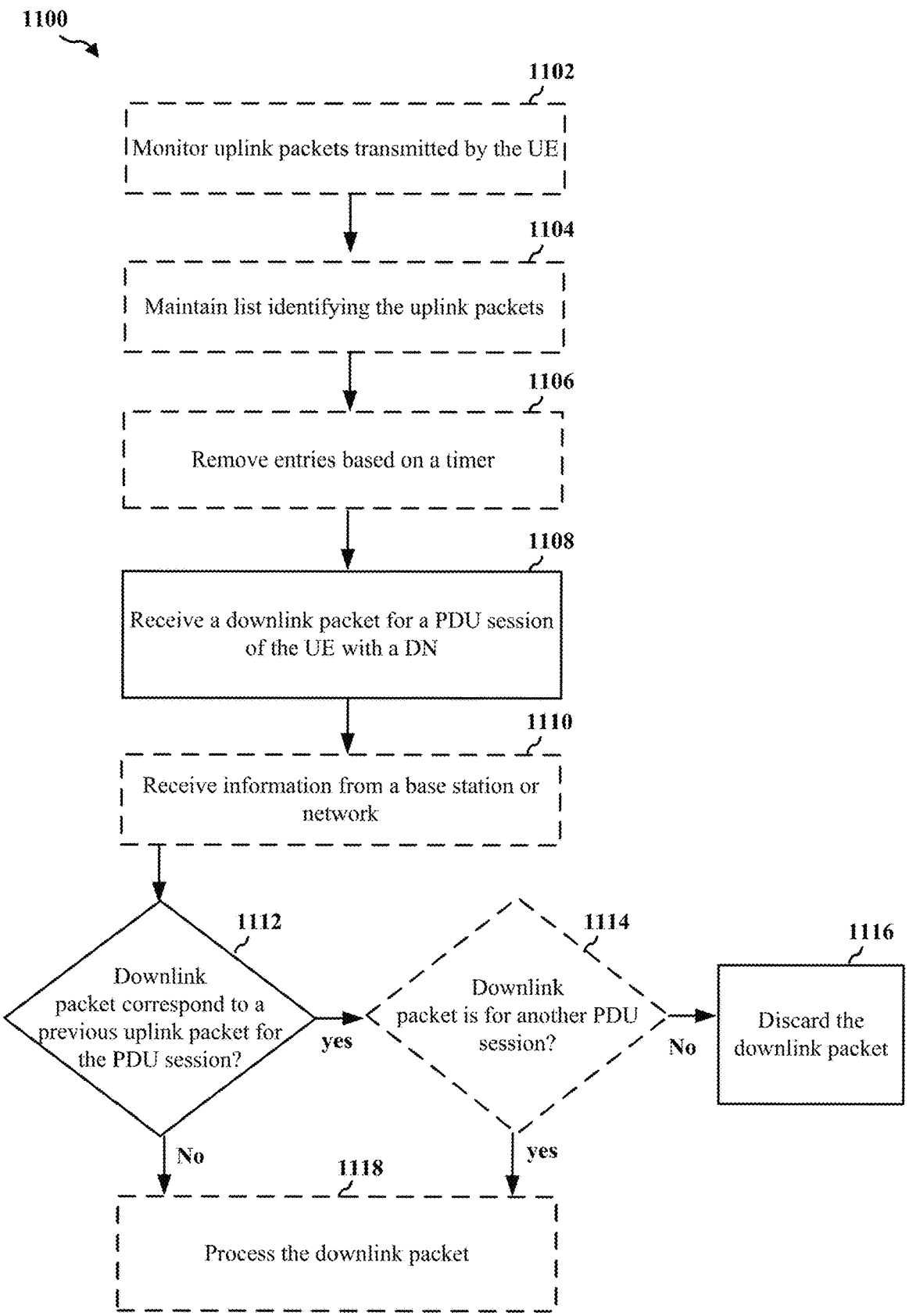
FIG. 11 is a flowchart illustrating a method of wireless communication that supports multicast/broadcast packets in accordance with some aspects of the present disclosure in accordance with some aspects of the present disclosure.

FIG. 11 is a flowchart 1100 illustrating an example of a method of wireless communication that supports multicast/broadcast packets in accordance with some aspects of the present disclosure. The method may be performed by a UE or a component of a UE (such as the UE 104, 350 1002; the apparatus 1302, which may include the memory 360 and which may be the entire UE 350 or a component of the UE 350, such as the TX processor 368, the RX processor 356, or the controller/processor 359). Optional aspects are illustrated with a dashed line. The method may enable a UE to handle downlink packets of broadcast/multicast packets based on uplink packets previously transmitted by the UE.

At 1108, the UE receives a downlink packet including broadcast or multicast (broadcast/multicast) Ethernet data for a PDU session of the UE with a DN. The UE may have previously transmitted uplink packet(s) for a PDU session with the DN, as described in connection with any of FIGS. 4-10. The reception may be performed, such as by at least one of the reception component 1330 or the downlink packet component 1340 of the apparatus 1302.

At 1112, the UE determines whether the downlink packet corresponds to an uplink packet for the PDU session that was previously transmitted to a base station. The determination may be performed, such as by determination component 1342 of apparatus 1302. The UE may transmit uplink packets for a PDU session with the DN. The uplink packets may be transmitted, such as by at least one of the uplink packet component 1344 or the transmission component 1334 of the apparatus 1302.

UE may make the determination at 1112 in various ways, such as described in connection with any of FIGS. 5 and 8-10. The determination may be based on information at the UE. For example, at 1102, the UE may monitor uplink packets transmitted by the UE, and may store information regarding the uplink packets. The monitoring may be performed, for example, by the monitor component 1352 of the apparatus 1302. The determination, at 1112, regarding whether the downlink packet corresponds to the uplink packet for the PDU session that was previously transmitted to the base station may be based on information stored at the UE, such as based on the monitoring. The stored information may include a list identifying the uplink packets transmitted by the UE for the PDU session. For each uplink packet identified in the list, the information may further include at least one of a source MAC address for the uplink packet, a VID for the uplink packet, a destination MAC address for the uplink packet, a header field for the uplink packet, a function of one or more fields of a corresponding uplink packet, non-header information included in a non-header field of the uplink packet, or suffix information included in a suffix for the uplink packet.

At 1104, the UE may maintain the list identifying the uplink packets transmitted by the UE for the PDU session based on the monitoring. Maintaining the list may include storing the list and adding entries as uplink packets are transmitted by the UE, for example, as detected by the monitoring, at 1102. The list may be maintained, for example, by the list component 1350 of the apparatus 1302.

At 1106, the UE may remove one or more entries identifying ones of the uplink packets from the list in order to maintain a current list. As an example, entries may be removed based on a timer. The entries may be removed, for example, by the list component 1350 of the apparatus 1302. In an example, the list may include substantially any identification of the uplink packets, which may or may not be in list form.

In another example, the determination, at 1112, may be based on information from the network. Thus, at 1110, the UE may receive information from the base station or a network, for example, a core network, and may use the information to perform the determination at 1112. Although the information is illustrated as being received after the receipt of the downlink packet, the information may instead be received prior to receipt of the downlink packet. The information may be received, for example, by the network information component 1354 or the reception component 1330 of the apparatus 1302. The information may include uplink packet information associated with uplink packets previously transmitted by the UE. The information may include a list identifying uplink packets transmitted by the UE. For each uplink packet identified in the list, the information may further include at least one of a source MAC address for the uplink packet, a VID for the uplink packet, a destination MAC address for the uplink packet, a header field for the uplink packet, a function of one or more fields of a corresponding uplink packet, non-header information included in a non-header field of the uplink packet, or suffix information included in a suffix for the uplink packet. Additionally or alternatively, the information may include an indication to the UE to not process or use the downlink packet for the PDU session, for example, as described in connection with FIG. 8 or 9. The indication may be received in a header of a PDU including the downlink packet. The information may be received from a core network, for example, as described in connection with FIG. 8. The indication or information may be received from a RAN, for example, as described in connection with FIG. 9. The indication or information may be received from a PDCP layer, a SDAP layer, or another layer of the RAN.

At 1116, the UE discards the downlink packet for the PDU session based at least in part on the determination. For example, the UE may discard the downlink packet for the PDU session when the downlink packet corresponds to an uplink packet for the same PDU session that was previously transmitted to the base station. The discard may be performed, for example, by the discard component 1348 of the apparatus 1302.

If the UE determines that the downlink packet corresponds to a previous uplink packet from the UE, the UE may determine, at 1114, whether the downlink packet is for another PDU session of the UE with the DN. The UE may determine to process the downlink packet for another PDU session of the UE, for example, even if the downlink packet corresponds to the uplink packet for the PDU session that the UE previously transmitted. The determination may be performed, for example, by the determination component 1342 of the apparatus 1302.

At 1118, the UE may process the downlink packet, for example, if the packet does not correspond to a previous uplink packet from the UE, as determined at 1112, or if the packet is for another PDU session of the UE with the DN, as determined at 1114. The downlink packet may be processed, for example, by the process component 1346 of the apparatus 1302.

Figure 12:
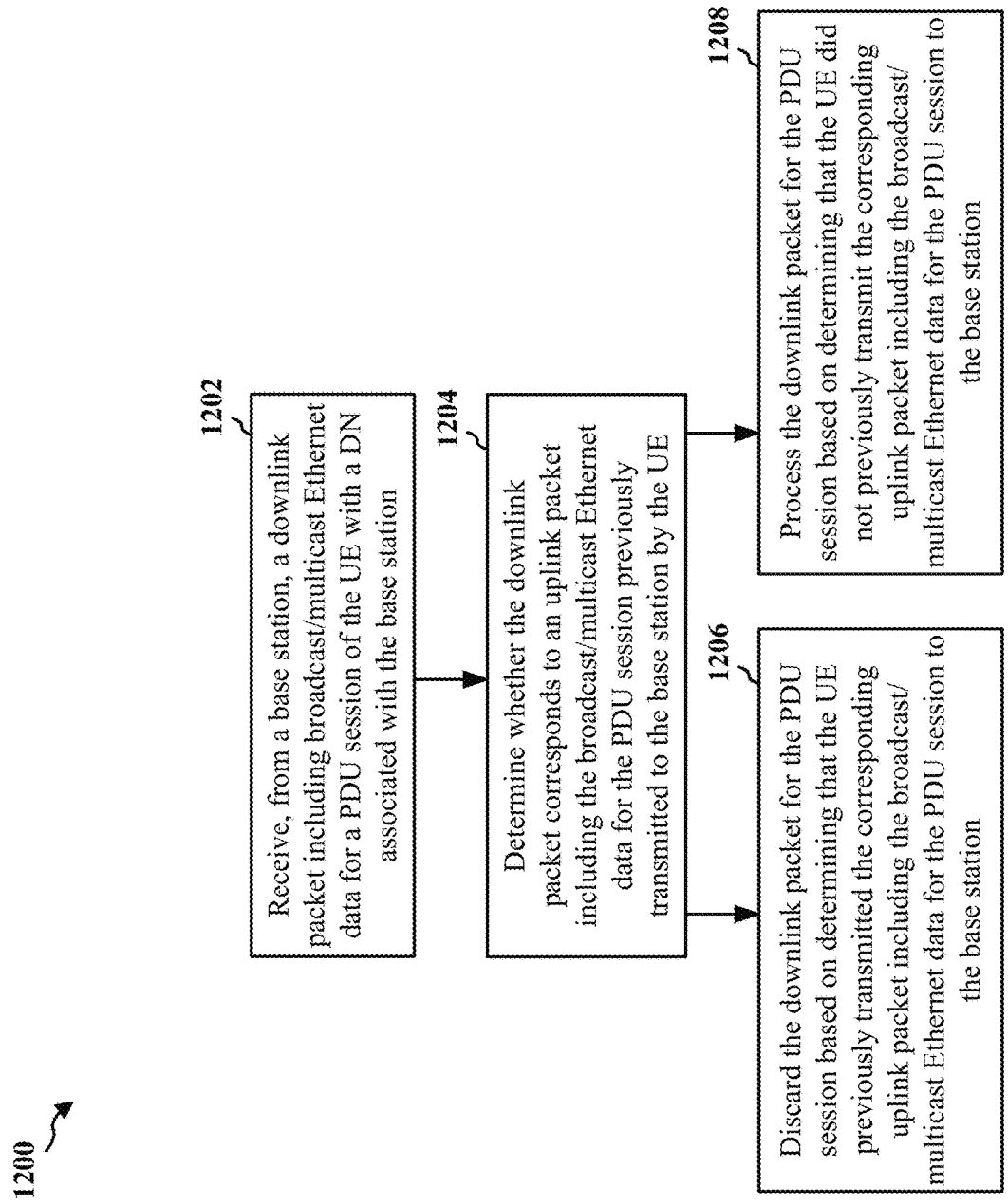
FIG. 12 is a flowchart illustrating a method of wireless communication that supports multicast/broadcast packets in accordance with some aspects of the present disclosure in accordance with some aspects of the present disclosure.

FIG. 12 is a flowchart 1200 illustrating an example of a method of wireless communication that supports multicast/broadcast packets in accordance with some aspects of the present disclosure. The method may be performed by a UE or a component of a UE (such as the UE 104, 350 1002; the apparatus 1302, which may include the memory 360 and which may be the entire UE 350 or a component of the UE 350, such as the TX processor 368, the RX processor 356, or the controller/processor 359). The method may enable a UE to handle downlink packets of broadcast/multicast packets based on uplink packets previously transmitted by the UE.

At 1202, the UE receives, from a base station, a downlink packet including broadcast or multicast (broadcast/multicast) Ethernet data for a PDU session of the UE with a DN. The UE may have previously transmitted uplink packet(s) for a PDU session of the UE with the DN associated with the base station, as described in connection with any of FIGS. 4-10. The reception may be performed, such as by at least one of the reception component 1330 or the downlink packet component 1340 of the apparatus 1302.

At 1204, the UE determines whether the downlink packet corresponds to an uplink packet including the broadcast/multicast Ethernet data for the PDU session that was previously transmitted to a base station by the UE. The determination may be performed, such as by determination component 1342 of apparatus 1302. The UE may transmit uplink packets for a PDU session with the DN. The uplink packets may be transmitted, such as by at least one of the uplink packet component 1344 or the transmission component 1334 of the apparatus 1302.

UE may make the determination at 1204 in various ways, such as described in connection with any of FIGS. 5 and 8-10. The determination may be based on information at the UE, as described above. In another example, the determination, at 1204, may be based on information from the network, as described above.

At 1206, the UE discards the downlink packet for the PDU session based on determining that the UE previously transmitted the corresponding uplink packet including the broadcast/multicast Ethernet data for the PDU session to the base station. For example, the UE may discard the downlink packet for the PDU session when the downlink packet corresponds to an uplink packet for the same PDU session that was previously transmitted to the base station. The discard may be performed, for example, by the discard component 1348 of the apparatus 1302.

At 1208, the UE may process the downlink packet for the PDU session based on determining that the UE did not previously transmit the corresponding uplink packet including the broadcast/multicast Ethernet data for the PDU session to the base station. The downlink packet may be processed, for example, by the process component 1346 of the apparatus 1302.

Figure 13:
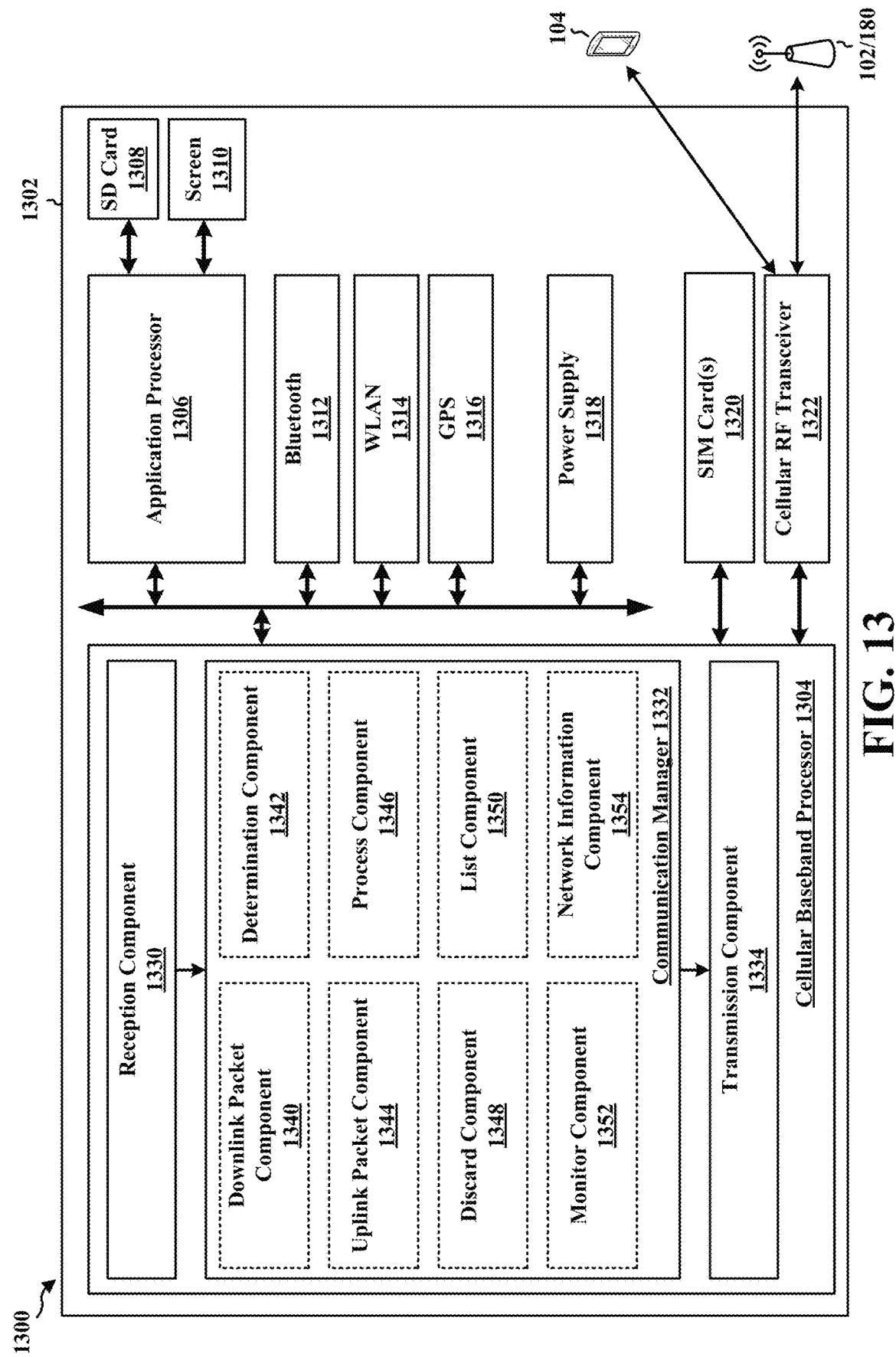
FIG. 13 is a diagram illustrating an example of a hardware implementation for an apparatus in accordance with some aspects of the present disclosure.

FIG. 13 is a diagram 1300 illustrating an example of a hardware implementation for an apparatus 1302. The apparatus 1302 may be a UE or a component of a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described herein. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the cellular baseband processor 1304, and in another configuration, the apparatus 1302 may be the entire UE (for example, see 350 of FIG. 3) and include the additional modules of the apparatus 1302 discussed herein.

The apparatus 1302 includes a reception component 1330 that receives downlink communication from a base station 102 or 180, such as described in connection with 1108 or 1110 in FIG. 11 or 12. The apparatus 1302 includes a transmission component 1334 that transmits uplink communication to the base station 102 or 180. The apparatus 1302 includes a downlink packet component 1340 configured to receive a downlink packet for a PDU session of the UE with a DN. The communication manager 1332 includes a determination component 1342 configured to determine whether the downlink packet corresponds to an uplink packet for the PDU session that was previously transmitted to a base station 102 or 180. The communication manager 1332 includes a discard component 1348 configured to discard the downlink packet for the PDU session based at least in part on the determination. The communication manager 1332 may include a process component 1346 configured to process the downlink packet, such as based on the determination of the determination component 1342. The communication manager 1332 may include an uplink packet component 1344 configured to transmit uplink packets for a PDU session with a DN. The communication manager 1332 may include a monitor component 1352 configured to monitor uplink packets transmitted by the UE. The apparatus

1302 may include a list component 1350 configured to maintain the list or other identification identifying the uplink packets, which may include removing one or more entries identifying ones of the uplink packets from the list based on a timer. The communication manager 1332 may include a network information component 1354 configured to receive information from one or more of the base station or a network. The determination of whether to discard the downlink packet may be further based on the information.

The apparatus may include additional components that perform each of the blocks of the algorithm in the aforementioned flowchart of FIG. 11 or 12. As such, each block in the aforementioned flowchart of FIG. 11 or 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for receiving a downlink packet for a PDU session of the UE with a DN. The apparatus 1302 includes means for determining whether the downlink packet corresponds to an uplink packet for the PDU session that was previously transmitted to a base station and means for discarding the downlink packet for the PDU session based at least in part on the determination. The apparatus 1302 may include means for processing the downlink packet. The apparatus 1302 may include means for monitoring uplink packets transmitted by the UE. The apparatus 1302 may include means for maintaining the list identifying the uplink packets. The apparatus 1302 may include means for removing one or more entries identifying ones of the uplink packets from the list based on a timer. The apparatus 1302 may include means for receiving information from one or more of the base station or a network, where the determination of whether to discard the downlink packet is further based on the information. The aforementioned means may be one or more of the aforementioned components of the apparatus 1302 configured to perform the functions recited by the aforementioned means. As described herein, the apparatus 1302 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 14:
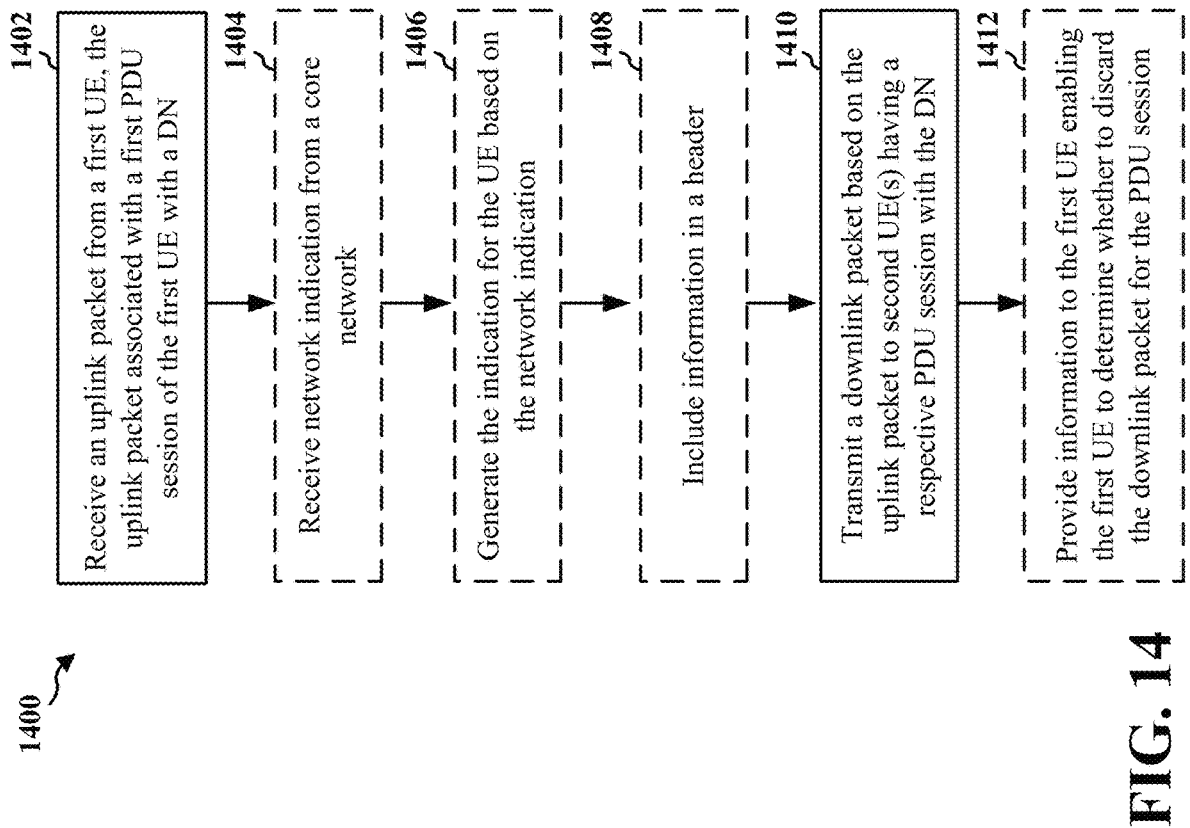
FIG. 14 is a flowchart of an example of a method of wireless communication in accordance with some aspects of the present disclosure.

FIG. 14 is a flowchart 1400 of an example of a method of wireless communication that supports multicast/broadcast packets in accordance with some aspects of the present disclosure. The method may be performed by a network entity, such as a base station or component of a base station, a core network entity or a component of a core network (such as the base station 102, 180, or 310, the RAN 404, 504, 604, 704, 804, 904, or 1004, the core network 406, 506, 606, 706, 806, 906, or 1006; the apparatus 1602, which may include the memory 376 and which may be the entire base station 310 or a component of the base station 310, such as any of the TX processor 316, the RX processor 370, or the controller/processor 375 and which may be a core network entity or a component of a core network entity). Optional aspects are illustrated with a dashed line. The method may help a network to handle uplink broadcast/multicast packets with greater efficiency.

At 1402, the network entity receives an uplink packet including broadcast/multicast Ethernet data from a first UE, the uplink packet being associated with a first PDU session of the first UE with a DN, such as described in connection with any of FIGS. 4-10. The uplink packet may include broadcast or multicast (broadcast/multicast) Ethernet data. The uplink packet may be received, such as by the reception component 1630 or the uplink packet component 1640 of the apparatus 1602.

At 1410, the network entity transmits (e.g., distributes) a downlink packet based on the uplink packet to a group of UEs including one or more second UEs, each of the one or more second UEs having a respective PDU session with the DN. The transmission of the downlink packet may be performed, such as by the downlink packet component 1642 or the transmission component 1634 of the apparatus 1602.

In some examples, the group of UEs may include the first UE, and the network entity may transmit information to the first UE enabling the first UE to determine whether to discard the downlink packet for the PDU session. The information may be transmitted in a header of a PDU including the downlink packet. The information may include an indication indicating, to the first UE, to discard the downlink packet for the PDU session. The information may include uplink packet information about uplink packets previously transmitted by the UE. The information may include a list identifying the uplink packets previously transmitted by the first UE. For each uplink packet identified in the list, the information may include at least one of a source MAC address for the uplink packet, a VID for the uplink packet, a destination MAC address for the uplink packet, a header field for the uplink packet, a function of one or more fields of a corresponding uplink packet, non-header information included in a non-header field of the uplink packet, or suffix information included in a suffix for the uplink packet.

In some examples, the downlink packet may be multicast to the group of UEs including the first UE. In some examples, the downlink packet may be unicast to each of the one or more second UEs.

The transmission of the downlink packet may avoid the first UE for the first PDU session, such as described in connection with the examples in FIG. 6 or 7. For example, the transmission of the downlink packet is unicast to each of the one or more second UEs, as described in connection with FIG. 6. The transmission of the downlink packet may be further unicast to the first UE, for example for a second PDU session of the first UE.

The network entity may be a base station of a RAN, and the downlink packet may be received from a core network using an individual tunnel for each of the one or more second UEs to which the downlink packet is transmitted, such as described in connection with FIG. 6. Then, the RAN may transmit the downlink packet to each of the one or more second UEs using individual downlink transmissions.

The network entity may include a core network entity, and the downlink packet may be transmitted from the core network entity to base station of a RAN using an individual tunnel for each of the one or more second UEs to which the downlink packet is transmitted, such as described in connection with FIG. 6. The downlink packet may be transmitted to each of the one or more second UEs using individual downlink transmissions.

The transmission of the downlink packet can be multicast to a group of UEs including the one or more second UEs. The group of UEs may not include the first UE. For example, the group of UEs may exclude the first UE, as described in connection with the example in FIG. 7. The network entity may be a base station of a RAN, and prior to transmitting the downlink packet, the downlink packet may be received from a core network using a joint tunnel for multiple UEs of the group of UEs, such as described in connection with FIG. 7. The downlink packet may then be transmitted to the one or more second UEs using a common downlink transmission, for example, the multicast. The network entity may include a core network entity, and the downlink packet may be transmitted to a RAN using a joint tunnel for the group of UEs, such as described in connection with FIG. 7.

The downlink packet may be multicast, to a group of UEs including the first UE, such as described in connection with FIG. 5, 8, or 9. At 1412, the network entity may provide information to the first UE enabling the first UE to determine whether to discard the downlink packet for the PDU session. The information may be provided, for example, by the information component 1644 of the apparatus 1602.

The information may include uplink packet information about uplink packets previously transmitted by the UE. The information may include a list or other identification identifying the uplink packets previously transmitted by the UE. For each uplink packet identified in the list, the information may further include at least one of a source MAC address for the uplink packet, a VID for the uplink packet, a destination MAC address for the uplink packet, a header field for the uplink packet, a function of one or more fields of a corresponding uplink packet, non-header information included in a non-header field of the uplink packet, or suffix information included in a suffix for the uplink packet.

The information provided at 1412 may include an indication to the UE to discard the downlink packet for the PDU session, for example, as described in connection with FIG. 8 or 9. The indication may be included in a header of a PDU including the downlink packet. The indication may be provided by a core network, for example, as described in connection with FIG. 8. The indication may be provided by a RAN, for example, as described in connection with FIG. 9. For example, the network entity may include the indication in the header by a layer of the RAN, at 1408. The indication may be included in the header by the PDCP, SDAP, or other layer of the RAN. The indication may be included in the header, for example, by the header component 1650 of the apparatus 1602.

At 1404, the network entity may receive a network indication from a core network to discard the downlink packet for the PDU session. For example, as described in connection with FIG. 9, the RAN may receive a discard indication from the core network. The network indication may be received, for example, by the network indication component 1646 or the reception component 1630 of the apparatus 1602.

At 1406, the network entity may generate the indication for the UE based on the network indication received from the core network. The indication may be generated, for example, by the generation component 1648 of the apparatus 1602. As described in connection with FIG. 9, the RAN may include an indication in a header or field of the downlink packet that is turned on, enabled, or triggered by an indication that the RAN receives from the core network. The indication may be included in the header, for example, by the header component 1650 of the apparatus 1602.

Figure 15:
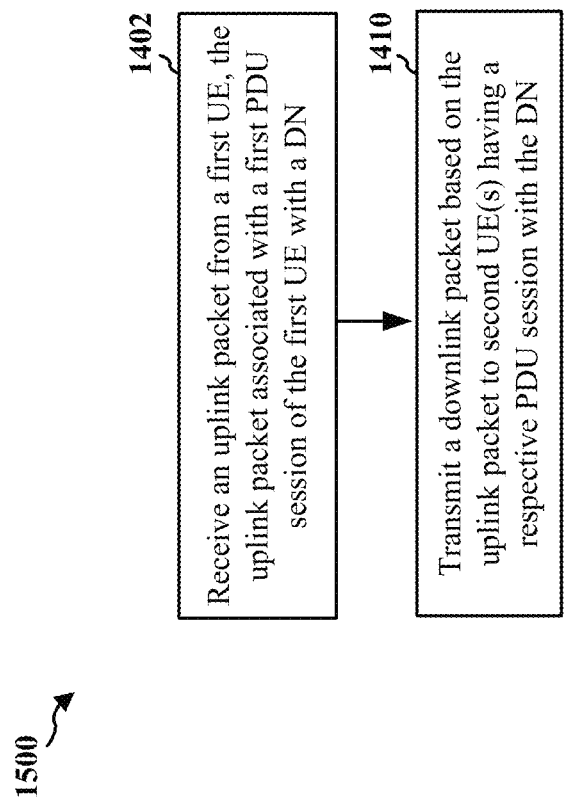
FIG. 15 is a flowchart of an example of a method of wireless communication in accordance with some aspects of the present disclosure.

FIG. 15 is a flowchart 1500 illustrating an example of a method of wireless communication that supports multicast/broadcast packets in accordance with some aspects of the present disclosure. FIG. 15 illustrates an example implementation that includes blocks 1402 and 1410 as described in connection with FIG. 14.

Figure 16:
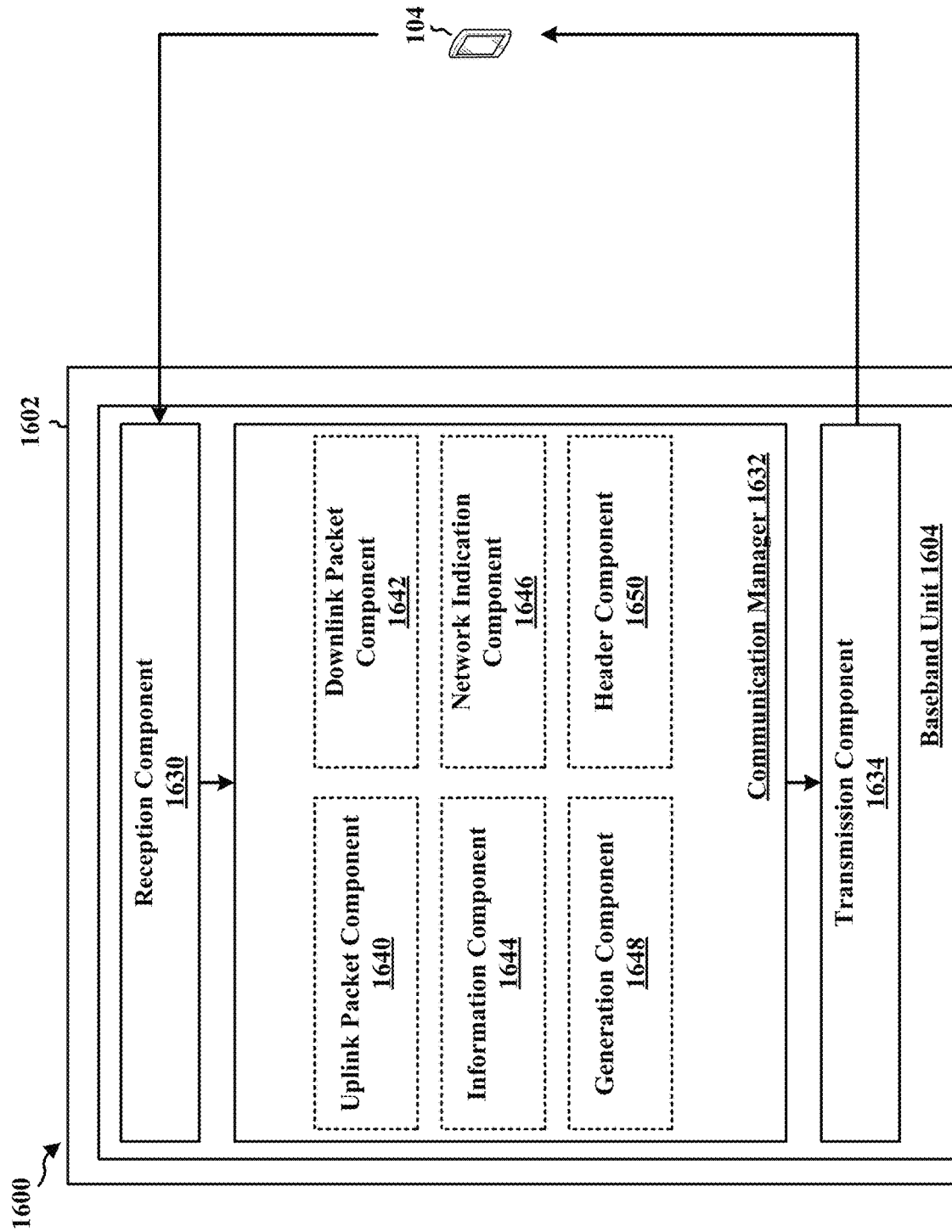
FIG. 16 is a diagram illustrating an example of a hardware implementation for an apparatus in accordance with some aspects of the present disclosure.

FIG. 16 is a diagram 1600 illustrating an example of a hardware implementation for an apparatus 1602. The apparatus 1602 may be a network entity, such as a core network component or a base station. The apparatus 1602 includes a baseband unit 1604. In some examples, the baseband unit 1604 may communicate through a cellular RF transceiver with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described herein. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The apparatus 1602 may be a network entity or a component of a network entity. In some examples, the apparatus 1602 may be a base station or a component of a base station. In some examples, the network entity may be another network entity, such as a core network entity. The apparatus 1602 includes a reception component 1630 configured to receive communication, such as described in connection with 1402 or 1404 in FIG. 14 or FIG. 15. The apparatus 1602 includes a transmission component 1634 that transmits communication, such as described in connection with 1410 or 1412 in FIG. 14 or FIG. 15. The communication manager 1632 includes an uplink packet component 1640 configured to receive an uplink packet from a first UE, the uplink packet being associated with a first PDU session of the first UE with a DN. The communication manager 1632 includes a downlink packet component 1642 configured to transmit a downlink packet based on the uplink packet to one or more second UEs, each of the second UEs having a respective PDU session with the DN. The communication manager 1632 may include an information component 1644 configured to provide information to the first UE enabling the first UE to determine whether to discard the downlink packet for the PDU session. The communication manager 1632 may include a header component 1650 configured to include the indication in the header by a layer of the RAN. The communication manager 1632 may include a network indication component 1646 configured to receive a network indication from a core network to discard the downlink packet for the PDU session. The communication manager 1632 may include a generation component 1648 configured to generate the indication for the UE based on the network indication received from the core network.

The apparatus may include additional components that perform each of the blocks of the algorithm in the aforementioned flowchart of FIG. 14 or 15. As such, each block in the aforementioned flowchart of FIG. 14 or 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes means for receiving an uplink packet from a first UE, the uplink packet being associated with a first PDU session of the first UE with a DN and means for transmitting a downlink packet based on the uplink packet to one or more second UEs, each of the second UEs having a respective PDU session with the DN. The apparatus 1602 may include means for providing information to the first UE enabling the first UE to determine whether to discard the downlink packet for the PDU session. The apparatus 1602 may include means for including the indication in the header by a layer of the RAN. The apparatus 1602 may include means for receiving a network indication from a core network to discard the downlink packet for the PDU session. The apparatus 1602 may include means for generating the indication for the UE based on the network indication received from the core network. The aforementioned means may be one or more of the aforementioned components of the apparatus 1602 configured to perform the functions recited by the aforementioned means. As described herein, the apparatus 1602 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person having ordinary skill in the art to practice the various aspects described herein. Various modifications to these aspects will be readily apparent to a person having ordinary skill in the art, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In the following, an overview of further examples is provided:

1. A method of wireless communication performed by a user equipment (UE), comprising:
   receiving, from a base station, a downlink packet comprising broadcast or multicast (broadcast/multicast) Ethernet data for a protocol data unit (PDU) session of the UE with a data network (DN) associated with the base station;
   determining whether the downlink packet corresponds to an uplink packet comprising the broadcast/multicast Ethernet data for the PDU session previously transmitted to the base station by the UE;
   discarding the downlink packet for the PDU session based on determining that the UE previously transmitted the corresponding uplink packet comprising the broadcast/multicast Ethernet data for the PDU session to the base station; and
   processing the downlink packet for the PDU session based on determining that the UE did not previously transmit the corresponding uplink packet comprising the broadcast/multicast Ethernet data for the PDU session to the base station.

2. The method of example 1, wherein the method further comprises processing the downlink packet for another PDU session of the UE based at least in part on determining that the UE previously transmitted the corresponding uplink packet comprising the broadcast/multicast Ethernet data for the PDU session to the base station.

3. The method of any of examples 1 or 2, further comprising monitoring uplink packets transmitted by the UE for the PDU session, wherein the determination of whether the downlink packet corresponds to the uplink packet comprising the broadcast/multicast Ethernet data for the PDU session previously transmitted to the base station by the UE is based on the monitoring.

4. The method of example 3, wherein the stored information comprises an identification of each of a plurality of the uplink packets transmitted by the UE for the PDU session, wherein, for each of the plurality of uplink packets, the information further comprises at least one of:
   a source medium access control (MAC) address,
   a virtual local area network identifier (VID),
   a destination MAC address,
   a header field,
   a function of one or more fields of a corresponding uplink packet,
   non-header information comprised in a non-header field, or suffix information comprised in a suffix.

5. The method of example 4, wherein the stored information comprises the identification that includes a plurality of entries, each of the entries including a respective identification of a respective one of the plurality of uplink packets transmitted by the UE for the PDU session, the method further comprising:
maintaining a timer associated with expiring entries from the identification;
maintaining, based at least in part on the monitoring and the timer, the identification, wherein maintaining the identification comprises removing one or more of the identifications of one or more respective uplink packets from the identification based on the timer.

6. The method of any of examples 1 to 5, further comprising receiving information from one or more of the base station associated with a radio access network (RAN) or a core network, wherein the determination of whether the downlink packet corresponds to the uplink packet comprising the broadcast/multicast Ethernet data for the PDU session previously transmitted to the base station by the UE is further based on the information.

7. The method of example 6, wherein the information comprises one or more of:
uplink packet information associated with uplink packets previously transmitted by the UE, or
an identification of each of a plurality of the uplink packets transmitted by the UE, wherein, for each of the plurality of uplink packets, the information further comprises at least one of:
a source medium access control (MAC) address,
a virtual local area network identifier (VID),
a destination MAC address,
a header field,
a function of one or more fields of a corresponding uplink packet,
non-header information comprised in a non-header field, or
suffix information comprised in a suffix.

8. The method of any of examples 6 or 7, wherein the information comprises an indication to the UE to not process the downlink packet for the PDU session.

9. The method of example 8, wherein the indication is received in a header of a PDU comprising the downlink packet.

10. The method of any of examples 1 to 9, wherein determining whether the downlink packet corresponds to the uplink packet comprising the broadcast/multicast Ethernet data for the PDU session previously transmitted to the base station by the UE comprises determining whether the downlink packet includes same data or parameters as the uplink packet.

11 A method of wireless communication performed by a network entity, comprising:
receiving an uplink packet comprising broadcast or multicast (broadcast/multicast) Ethernet data from a first user equipment (UE), the uplink packet being associated with a first protocol data unit (PDU) session of the first UE with a data network (DN); and
transmitting a downlink packet based on the uplink packet to a group of UEs including one or more second UEs, each of the one or more second UEs having a respective PDU session with the DN.

12. The method of example 11, wherein the group of UEs includes the first UE, the method further comprising:
transmitting information to the first UE enabling the first UE to determine whether to discard the downlink packet for the PDU session.

13. The method of example 12, wherein the information is transmitted in a header of a PDU comprising the downlink packet and wherein the information includes an indication indicating, to the first UE, to discard the downlink packet for the PDU session.

14. The method of any of examples 12 or 13, wherein the information comprises uplink packet information about uplink packets previously transmitted by the first UE.

15. The method of example 14, wherein the information comprises an identification of each of a plurality of the uplink packets previously transmitted by the first UE, wherein for each of the plurality of uplink packets, the information further comprises at least one of:
a source medium access control (MAC) address,
a virtual local area network identifier (VID),
a destination MAC address,
a header field,
a function of one or more fields of a corresponding uplink packet,
non-header information comprised in a non-header field, or
suffix information comprised in a suffix.

16. The method of any of examples 12 to 15, wherein the network entity is a base station of a radio access network (RAN), the method further comprising:
receiving a network indication from a core network to discard the downlink packet for the PDU session; and
generating an indication for the UE to discard the downlink packet based on the network indication received from the core network.

17. The method of any of examples 12 to 16, wherein the downlink packet is multicast to the group of UEs including the first UE.

18. The method of any of examples 11 to 17, wherein the downlink packet is unicast to each of the one or more second UEs.

19. The method of example 18, wherein the downlink packet is unicast to the first UE for a second PDU session of the first UE.

20. The method of any of examples 11 to 19, wherein:
the network entity comprises a radio access network (RAN),
the downlink packet is received from a core network using an individual tunnel for each of the one or more second UEs to which the downlink packet is transmitted, and
the downlink packet is transmitted to each of the one or more second UEs using individual downlink transmissions.

21. The method of any of examples 11 to 20, wherein the network entity comprises a core network entity, and wherein the downlink packet is transmitted from the core network entity to a radio access network (RAN) using an individual tunnel for each of the one or more second UEs to which the downlink packet is transmitted.

22. The method of any of examples 11 to 21, wherein the group of UEs does not include the first UE.

23. The method of any of examples 11 to 22, wherein:
the network entity comprises a radio access network (RAN),
prior to transmitting the downlink packet, the downlink packet is received from a core network using a joint tunnel for multiple UEs of the group of UEs, and
the downlink packet is transmitted to the one or more second UEs using a common downlink transmission.

24. The method of any of examples 11 to 23, wherein the network entity comprises a core network entity, and wherein the downlink packet is transmitted to a radio access network (RAN) using a joint tunnel for the group of UEs.

25. An apparatus for wireless communication, comprising:
a transceiver;
a memory configured to store instructions; and
one or more processors communicatively coupled with the memory and the transceiver,
wherein the one or more processors are configured to perform one or more of the methods of any of examples 1 to 24.

26. An apparatus for wireless communication, comprising means for performing one or more of the methods of any of examples 1 to 24.

27. A computer-readable medium, comprising code executable by one or more processors for wireless communications, the code comprising code for performing one or more of the methods of any of examples 1 to 24.

What is claimed is:

1. A method of wireless communication performed by a network entity, comprising:
   receiving an uplink packet comprising broadcast or multicast Ethernet data from a first user equipment, the uplink packet being associated with a first protocol data unit session of the first user equipment with a data network; and
   transmitting a downlink packet based on the uplink packet to a group of user equipments including one or more second user equipments, each of the one or more second user equipments having a respective protocol data unit session with the data network.

2. The method of claim 1, wherein the group of user equipments includes the first user equipment, the method further comprising:
   transmitting information to the first user equipment enabling the first user equipment to determine whether to discard the downlink packet for the protocol data unit session.

3. The method of claim 2, wherein the information is transmitted in a header of a protocol data unit comprising the downlink packet and wherein the information includes an indication indicating, to the first user equipment, to discard the downlink packet for the protocol data unit session.

4. The method of claim 2, wherein the information comprises uplink packet information about uplink packets previously transmitted by the first user equipment.

5. The method of claim 4, wherein the information comprises an identification of each of a plurality of the uplink packets previously transmitted by the first user equipment, wherein for each of the plurality of uplink packets, the information further comprises at least one of:
   a source medium access control address,
   a virtual local area network identifier,
   a destination medium access control address,
   a header field,
   a function of one or more fields of a corresponding uplink packet,
   non-header information comprised in a non-header field, or
   suffix information comprised in a suffix.

6. The method of claim 2, wherein the network entity is a base station of a radio access network, the method further comprising:

receiving a network indication from a core network to discard the downlink packet for the protocol data unit session; and
   generating an indication for the user equipment to discard the downlink packet based on the network indication received from the core network.

7. The method of claim 2, wherein the downlink packet is multicast to the group of user equipments including the first user equipment.

8. The method of claim 1, wherein the downlink packet is unicast to each of the one or more second user equipments.

9. The method of claim 8, wherein the downlink packet is unicast to the first user equipment for a second protocol data unit session of the first user equipment.

10. The method of claim 1, wherein:
    the network entity comprises a radio access network,
    the downlink packet is received from a core network using an individual tunnel for each of the one or more second user equipments to which the downlink packet is transmitted, and
    the downlink packet is transmitted to each of the one or more second user equipments using individual downlink transmissions.

11. The method of claim 1, wherein the network entity comprises a core network entity, and wherein the downlink packet is transmitted from the core network entity to a radio access network using an individual tunnel for each of the one or more second user equipments to which the downlink packet is transmitted.

12. The method of claim 1, wherein the group of user equipments does not include the first user equipment.

13. The method of claim 1, wherein:
    the network entity comprises a radio access network,
    prior to transmitting the downlink packet, the downlink packet is received from a core network using a joint tunnel for multiple user equipments of the group of user equipments, and
    the downlink packet is transmitted to the one or more second user equipments using a common downlink transmission.

14. The method of claim 1, wherein the network entity comprises a core network entity, and wherein the downlink packet is transmitted to a radio access network using a joint tunnel for the group of user equipments.

15. An apparatus for wireless communication by a network entity, comprising:
    memory; and
    at least one processor coupled to the memory and configured to cause the network entity to:
       receive an uplink packet comprising broadcast or multicast Ethernet data from a first user equipment, the uplink packet being associated with a first protocol data unit session of the first user equipment with a data network; and
       transmit a downlink packet based on the uplink packet to a group of user equipments including one or more second user equipments, each of the one or more second user equipments having a respective protocol data unit session with the data network.

16. The apparatus of claim 15, wherein the group of user equipments includes the first user equipment, the at least one processor being further configured to:
    provide information to the first user equipment enabling the first user equipment to determine whether to discard the downlink packet for the protocol data unit session.

17. The apparatus of claim 16, wherein the information is in a header of a protocol data unit comprising the downlink packet and wherein the information includes an indication indicating, to the first user equipment, to discard the downlink packet for the protocol data unit session.

18. The apparatus of claim 16, wherein the information comprises uplink packet information about uplink packets previously transmitted by the first user equipment.

19. The apparatus of claim 18, wherein the information comprises an identification of each of a plurality of the uplink packets previously transmitted by the first user equipment, wherein for each of the plurality of uplink packets, the information further comprises at least one of:
a source medium access control address,
a virtual local area network identifier,
a destination medium access control address,
a header field,
a function of one or more fields of a corresponding uplink packet,
non-header information comprised in a non-header field, or
suffix information comprised in a suffix.

20. The apparatus of claim 16, wherein the network entity is a base station of a radio access network, and the at least one processor is further configured to cause the network entity to:
receive a network indication from a core network to discard the downlink packet for the protocol data unit session; and
generate an indication for the user equipment to discard the downlink packet based on the network indication received from the core network.

21. The apparatus of claim 16, wherein the downlink packet is multicast to the group of user equipments including the first user equipment.

22. The apparatus of claim 15, wherein the downlink packet is unicast to each of the one or more second user equipments.

23. The apparatus of claim 22, wherein the downlink packet is unicast to the first user equipment for a second protocol data unit session of the first user equipment.

24. The apparatus of claim 15, wherein the network entity comprises a radio access network, and the at least one processor is further configured to cause the network entity to:
receive the downlink packet from a core network using an individual tunnel for each of the one or more second user equipments to which the downlink packet is transmitted in individual downlink transmissions.

25. The apparatus of claim 15, wherein the network entity comprises a core network entity, and wherein the at least one processor is configured to cause the network entity to transmit the downlink packet from the core network entity to a radio access network using an individual tunnel for each of the one or more second user equipments to which the downlink packet is transmitted.

26. The apparatus of claim 15, wherein the group of user equipments does not include the first user equipment.

27. The apparatus of claim 15, wherein the network entity comprises a radio access network, and wherein the at least one processor is further configured to cause the network entity to:
receive the downlink packet from a core network using a joint tunnel for multiple user equipments of the group of user equipments prior to transmission of the downlink packet to the one or more second user equipments using a common downlink transmission.

28. The apparatus of claim 15, wherein the network entity comprises a core network entity, and wherein the at least one processor is configured to cause the network entity to transmit the downlink packet to a radio access network using a joint tunnel for the group of user equipments.

29. An apparatus for wireless communication at a network entity, comprising:
means for receiving an uplink packet comprising broadcast or multicast Ethernet data from a first user equipment, the uplink packet being associated with a first protocol data unit session of the first user equipment with a data network; and
means for transmitting a downlink packet based on the uplink packet to a group of user equipments including one or more second user equipments, each of the one or more second user equipments having a respective protocol data unit session with the data network.

30. A non-transitory computer-readable storage medium storing computer executable code at a network entity, the code when executed by at least one processor causes the network entity to:
receive an uplink packet comprising broadcast or multicast Ethernet data from a first user equipment, the uplink packet being associated with a first protocol data unit session of the first user equipment with a data network; and
transmit a downlink packet based on the uplink packet to a group of user equipments including one or more second user equipments, each of the one or more second user equipments having a respective protocol data unit session with the data network.

* * * * *